(12) United States Patent
Senapathy

(10) Patent No.: US 12,277,655 B2
(45) Date of Patent: Apr. 15, 2025

(54) TRAVELING IN TIME AND SPACE CONTINUUM

(71) Applicant: Periannan Senapathy, Madison, WI (US)

(72) Inventor: Periannan Senapathy, Madison, WI (US)

(73) Assignee: Periannan Senapathy, Madison, WI (US)

( * ) Notice: Subject to any disclaimer, the term of this patent is extended or adjusted under 35 U.S.C. 154(b) by 104 days.

(21) Appl. No.: 18/129,786

(22) Filed: Mar. 31, 2023

(65) Prior Publication Data

US 2023/0319426 A1 Oct. 5, 2023

Related U.S. Application Data

(60) Provisional application No. 63/493,135, filed on Mar. 30, 2023, provisional application No. 63/421,495, filed on Nov. 1, 2022, provisional application No. 63/391,191, filed on Jul. 21, 2022, provisional application No. 63/343,957, filed on May 19, 2022, provisional application No. 63/327,216, filed on Apr. 4, 2022.

(51) Int. Cl.
| G06T 19/00 | (2011.01) |
| G06Q 10/087 | (2023.01) |
| G06T 15/20 | (2011.01) |
| H04N 5/265 | (2006.01) |
| H04N 23/90 | (2023.01) |

(52) U.S. Cl.
CPC ......... G06T 19/006 (2013.01); G06Q 10/087 (2013.01); G06T 15/20 (2013.01); G06T 19/003 (2013.01); H04N 5/265 (2013.01); H04N 23/90 (2023.01)

(58) Field of Classification Search
CPC ...... G06Q 10/087; H04N 23/90; H04N 5/265; G06T 15/20; G06T 19/006; G06T 19/003
USPC ...................................................... 348/211.11
See application file for complete search history.

(56) References Cited

U.S. PATENT DOCUMENTS

| 9,230,250 | B1* | 1/2016 | Parker | G06Q 30/0185 |
| 10,212,319 | B1* | 2/2019 | Carter | G06V 20/52 |
| 10,681,338 | B1* | 6/2020 | Chen | H04N 13/296 |
| 10,685,679 | B1* | 6/2020 | Bhuruth | G06T 19/003 |
| 10,839,594 | B2* | 11/2020 | Besley | H04N 13/243 |
| 11,039,120 | B2* | 6/2021 | Yokota | H04N 23/45 |
| 11,159,702 | B1* | 10/2021 | Carter, II | H04N 23/74 |
| 2004/0017929 | A1* | 1/2004 | Bramblet | G07C 9/00 382/103 |
| 2015/0086107 | A1* | 3/2015 | Dedeoglu | G06F 18/211 382/154 |
| 2019/0394447 | A1* | 12/2019 | Yokota | H04N 13/243 |
| 2020/0168252 | A1* | 5/2020 | Bhuruth | G11B 27/34 |
| 2020/0184710 | A1* | 6/2020 | Besley | G06T 19/00 |
| 2022/0058883 | A1* | 2/2022 | Yan | G06T 19/006 |

* cited by examiner

*Primary Examiner* — Pritham D Prabhakher
(74) *Attorney, Agent, or Firm* — Knobbe, Martens, Olson & Bear, LLP

(57) ABSTRACT

Generally described, one or more aspects of the present application relate to capturing and generating viewpoints of any given space. Pixel averaging and camera configurations, including microlens cameras, may be implemented to generate and capture viewpoints of any given space.

21 Claims, 22 Drawing Sheets

A series of 24 cameras

Distance between cameras = 1.12 meters

Scenery
26.8 meters

Time taken = 1 second

Speed = 60 miles/hour
Distance traveled in one second at 60 miles/hour speed = 26.8 meters Time taken between the capture of successive frames = 41.7 milliseconds

TRAVELING IN TIME AND SPACE CONTINUUM

RELATED APPLICATIONS

This application claims the benefit of U.S. Provisional Application No. 63/327,216, entitled "TRAVELING IN TIME AND SPACE CONTINUUM" and filed on Apr. 4, 2022, U.S. Provisional Application No. 63/343,957, entitled "TRAVELING IN TIME AND SPACE CONTINUUM II" and filed on May 19, 2022, U.S. Provisional Application No. 63/391,191, entitled "TRAVELING IN TIME AND SPACE CONTINUUM—TASC" and filed on Jul. 21, 2022, U.S. Provisional Application No. 63/421,495, entitled "TRAVELING IN TIME AND SPACE CONTINUUM—TASC" and filed on Nov. 1, 2022, and U.S. Provisional Application No. 63/493,135, entitled "TRAVELING IN TIME AND SPACE CONTINUUM—TASC" and filed on Mar. 30, 2023, which are hereby incorporated by reference herein in their entireties.

TECHNICAL FIELD

This disclosure relates to the field of camera systems, devices, software applications, and particularly to systems, methods, and techniques for realistic, immersive audiovisual experiences involving traveling through a virtual representation of a real space.

BACKGROUND

Virtual environments and platforms have been developed to allow for a user to traverse various virtual spaces. For example, mapping tools exist in which various street-level images of a location are captured, the images are associated with a position on a map that corresponds with the location, and users are allowed to view the street-level images when selecting the position on the map.

However, these existing virtual environments and platforms suffer from technical limitations in image capture, image processing, and the recreation of three-dimensional spaces. For example, it can be difficult for users to navigate between different locations or to view real-time changes at various locations in existing virtual environments and platforms.

SUMMARY

The systems, methods, and devices described herein each have several aspects, no single one of which is solely responsible for its desirable attributes. Without limiting the scope of this disclosure, several non-limiting features will now be discussed briefly.

In some aspects, the techniques described herein relate to a computer-implemented method for remote viewing, the computer-implemented method including: obtaining a sequence of images of a location, wherein the sequence of images is captured by at least one of a plurality of cameras positioned at one or more positions in the location; generating a virtual space, wherein the virtual space is a virtual representation of the location; determining at least one of a position, a direction of travel, or a speed of travel of a remote user within the virtual representation of the location based on one or more measurements obtained from a sensory input from the remote user; selecting a subset of cameras from the plurality of cameras positioned at one or more positions in the location based on at least one of the position, the direction of travel, or the speed of travel of the user within the virtual representation of the location; and causing a user device located at the remote location of the remote user to display one or more images in the sequence of images captured by the subset of cameras in an order based on the position, the direction of travel, and the speed of travel of the user within the virtual representation of the location.

The computer implemented method of the preceding paragraph can include any sub-combination of the following features: the computer-implemented method, further including: receiving an indication of an object to track and a first image in the sequence of images captured by a first camera in the subset of cameras and displayed by the user device; applying image processing to the first image to identify a characteristic of the object; applying image processing to images in the sequence of images other than the first image to identify a second image in the sequence of images that depicts the object with the characteristic; and causing the user device to display the second image following the first image; the computer-implemented method, wherein applying image processing to the first image further includes applying the first image as an input to a trained object detection artificial intelligence model, wherein applying the first image as the input to the trained object detection artificial intelligence model causes the trained object detection artificial intelligence model to output an indication that the object with the characteristic is depicted in the first image; the computer-implemented method, wherein causing a user device to display one or more images in the sequence of images captured by the subset of cameras in an order based on the position, the direction of travel, and the speed of travel of the user within the virtual representation of the location further includes: determining a location of a first camera in the subset of cameras that captured a first image in the sequence of images that is displayed by the user device; determining a distance from the first camera based on at least one of the direction of travel of the user or the speed of travel of the user; determining that a second camera in the subset of cameras is located at a distance from the location of the first camera that matches the determined distance; and causing the user device to display a second image in the sequence of images captured by the second camera subsequent to the user device displaying the first image; the computer-implemented method, wherein the sensory input includes one of a touch input, a haptic input, a gesture input, a wearable input, or a voice input provided to the user device; the computer-implemented method, further including determining at least one of an updated position, an updated direction of travel, or an updated speed of a travel of the user within the virtual representation of the location based on one or more second measurements obtained from the sensory input and generated subsequent to the one or more measurements; the computer-implemented method, wherein each camera in the plurality of cameras is spaced evenly throughout the location; the computer-implemented method, wherein at least some cameras in the plurality of cameras are spaced unevenly throughout the location; the computer-implemented method, wherein the one or more images captured by the subset of cameras are displayed by the user device within a threshold time of the one or more images being captured by the subset of cameras; the computer-implemented method, wherein the one or more images captured by the subset of cameras are displayed by the user device at a rate that is slower than a rate at which the one or more images are captured by the subset of cameras; the computer-implemented method, wherein the one or more images captured by the subset of cameras are displayed by the user device at a rate that is faster than a rate at which the one or more images are captured by the subset of cameras; the computer implemented method, wherein causing a user device to display one or more images in the sequence of images captured by the subset of cameras in an order based on the position, the direction of travel, and the speed of travel of the user within the virtual representation of the location further includes: determining a location of a first camera in the subset of cameras that captured a first image in the sequence of images that is displayed by the user device; determining a first position from the first camera based on at least one of the direction of travel of the user or the speed of travel of the user; determining that a second camera in the subset of cameras is located at a second position from the location of the first camera, wherein the second position's distance is greater from the position of the first camera than the first position, wherein the second camera is closest in location to the first position; generating a pixel-averaged frame; and causing the user device to display the pixel-averaged frame in the sequence of images subsequent to the user device displaying the first image; the computer implemented method, wherein the step of generating a pixel-averaged frame includes: retrieving one or more picture frames each from the first camera and the second camera; and averaging RGB values of one or more pixels including the one or more picture frames at corresponding relative coordinate positions from the one or more picture frames to generate the pixel-averaged frame; the computer implemented method, wherein averaging RGB values of one or more pixels includes: determining the individual red, green, and blue values of the one or more pixels including the one or more picture frames, determining an average red, green, and blue values for each of the one or more pixels, thereby generating an averaged pixel for each of the one or more pixels and generating the pixel averaged frame by positioning the averaged pixel for each of the one or more pixels; the computer implemented method, wherein there are no intervening cameras located between the positions of the first and the second cameras; the computer implemented method, wherein the pixel averaged frame approximates a view generated by a virtual third camera located in between the positions of the first and second cameras, wherein the virtual third camera is not present between the positions of the first and second cameras, wherein the virtual third camera is located at the first position; the computer implemented method, wherein the pixel averaged frame is image corrected before causing the user device to display the pixel-averaged frame, wherein image correction includes one or more of: distortion correction, perspective correction, or angle-distortion correction.

In some aspects, the techniques described herein relate to a system for remote viewing, the system including: memory configured to store computer-executable instructions; and a hardware processor in communication with the memory, wherein the computer-executable instructions, when executed by the hardware processor, cause the hardware processor to: obtain a sequence of images of a location, wherein the sequence of images is captured by at least one of a plurality of cameras positioned at one or more positions in the location; generate a virtual space, wherein the virtual space is a virtual representation of the location; determine at least one of a position, a direction of travel, or a speed of travel of a remote user within the virtual representation of the location based on one or more measurements obtained from a sensory input; select a subset of cameras from the plurality of cameras positioned at one or more positions in the location based on at least one of the position, the direction of travel, or the speed of travel of the user within the virtual representation of the location; and cause a user device to display one or more images in the sequence of images captured by the subset of cameras in an order based on the position, the direction of travel, and the speed of travel of the user within the virtual representation of the location.

The system of the preceding paragraph can include any sub-combination of the following features: the system, wherein the computer-executable instructions, when executed, further cause the hardware processor to: obtain an indication of an object to track and a first image in the sequence of images captured by a first camera in the subset of cameras and displayed by the user device; apply image processing to the first image to identify a characteristic of the object; apply image processing to images in the sequence of images other than the first image to identify a second image in the sequence of images that depicts the object with the characteristic; and cause the user device to display the second image following the first image; the system, wherein the computer-executable instructions, when executed, further cause the hardware processor to apply the first image as an input to a trained object detection artificial intelligence model, wherein application of the first image as the input to the trained object detection artificial intelligence model causes the trained object detection artificial intelligence model to output an indication that the object with the characteristic is depicted in the first image; the system, wherein the computer-executable instructions, when executed, further cause the hardware processor to: determine a location of a first camera in the subset of cameras that captured a first image in the sequence of images that is displayed by the user device; determine a distance from the first camera based on at least one of the direction of travel of the user or the speed of travel of the user; determine that a second camera in the subset of cameras is located at a distance from the location of the first camera that matches the determined distance; and cause the user device to display a second image in the sequence of images captured by the second camera subsequent to the user device displaying the first image; the system, wherein the sensory input includes one of a touch input, a haptic input, a gesture input, a wearable input, or a voice input provided to the user device; the system, wherein the computer-executable instructions, when executed, further cause the hardware processor to determine at least one of an updated position, an updated direction of travel, or an updated speed of a travel of the user within the virtual representation of the location based on one or more second measurements obtained from the sensory input and generated subsequent to the one or more measurements.

In some aspects, the techniques described herein relate to a non-transitory, computer-readable medium storing computer-executable instructions for remote viewing, wherein the computer-executable instructions, when executed, cause a computing system to: obtain a sequence of images of a location, wherein the sequence of images is captured by at least one of a plurality of cameras positioned at one or more positions in the location; generate a virtual space, wherein the virtual space is a virtual representation of the location; determine at least one of a position, a direction of travel, or a speed of travel of a remote user within the virtual representation of the location based on one or more measurements obtained from a sensory input; select a subset of cameras from the plurality of cameras positioned at one or more positions in the location based on at least one of the position, the direction of travel, or the speed of travel of the user within the virtual representation of the location; and cause a user device to display one or more images in the sequence of images captured by the subset of cameras in an order based on the position, the direction of travel, and the speed of travel of the user within the virtual representation of the location.

The non-transitory, computer-readable medium storing computer-executable instructions of the preceding paragraph can include any sub-combination of the following features: the non-transitory, computer-readable medium, wherein the computer-executable instructions, when executed, further cause the computing system to: obtain an indication of an object to track and a first image in the sequence of images captured by a first camera in the subset of cameras and displayed by the user device; apply image processing to the first image to identify a characteristic of the object; apply image processing to images in the sequence of images other than the first image to identify a second image in the sequence of images that depicts the object with the characteristic; and cause the user device to display the second image following the first image; the computer-executable instructions, when executed, further cause the computing system to: determine a location of a first camera in the subset of cameras that captured a first image in the sequence of images that is displayed by the user device; determine a distance from the first camera based on at least one of the direction of travel of the user or the speed of travel of the user; determine that a second camera in the subset of cameras is located at a distance from the location of the first camera that matches the determined distance; and cause the user device to display a second image in the sequence of images captured by the second camera subsequent to the user device displaying the first image.

In some aspects, the techniques described herein relate to a system for capturing a scene, the system including: a plurality of cameras, wherein each camera in the plurality of cameras is distributed throughout a location, wherein each camera in the plurality of cameras is configured to capture an image at a predetermined frame per second value; and a image processing system including a hardware processor and in networked communication with the plurality of cameras, the image processing system configured with computer-executable instructions that, when executed by the hardware processor, cause the image processing system to integrate output from the plurality of cameras with a perspective view of a virtual representation of the location.

The system of the preceding paragraph can include any sub-combination of the following features: the system, wherein the plurality of cameras is evenly spaced throughout the location; the system, wherein the plurality of cameras is irregularly spaced throughout the location; the system, wherein the computer-executable instructions, when executed, further cause the image processing system to: select a subset of cameras from the plurality of cameras; and integrate output from the subset of cameras with the perspective view of the virtual representation of the location; the system, wherein the location includes one of an event hall, an aquarium, a mall, a grocery store, a grocery aisle, a concert hall, an outdoor space, a park, or a conference room; the system, wherein the plurality of cameras includes a microlens camera; the system, wherein the microlens camera includes a plurality of lenses coupled together to form one of a sphere, a cylinder, a three dimensional elliptical, or a cone.

In some aspects, the techniques described herein relate to a computer-implemented method of interacting with a virtual representation of a space, the computer-implemented method including: receiving a first set of user inputs, the first set of user inputs indicating a first point of view (POV) request; generating a first POV based on the first POV request, wherein the first POV is a virtual representation of a scene from a first angle, wherein the virtual representation of the scene includes one or more images captured by a plurality of imaging devices at a time at which the first POV request is received; receiving a second set of user inputs, the second set of user inputs indicating a second POV request; and generating a second POV based on the second POV request, wherein the second POV is an updated version of the virtual representation of the scene from a second angle, wherein the updated version of the virtual representation of the scene includes one or more second images captured by the plurality of imaging devices at a second time at which the second POV request is received.

The computer implemented method of the preceding paragraph can include any sub-combination of the following features: the computer-implemented method, wherein the first set of user inputs includes an indication of a time scale; the computer-implemented method, wherein the first set of user inputs includes an indication of a direction and a speed at which to move within the virtual representation of the scene; the computer-implemented method, wherein the plurality of imaging devices includes a microlens camera; the computer-implemented method, wherein the microlens camera includes a plurality of lenses coupled together to form one of a sphere, a cylinder, a three dimensional ellipse, or a cone; the computer-implemented method, wherein the first set of user inputs includes an indication of a first direction at which to move within the virtual representation of the scene, wherein the one or more images depict a portion of the scene in a direction of the first direction, wherein the second set of user inputs includes an indication of a second direction at which to move within the virtual representation of the scene, and wherein the one or more second images depict a portion of the scene in a direction of the second direction.

In some aspects, the techniques described herein relate to a system including: memory storing computer-executable instructions; and a hardware processor in communication with the memory, wherein the computer-executable instructions, when executed by the hardware processor, cause the hardware processor to: generate a virtual representation of a location, wherein the location includes a plurality of image capture devices, wherein the plurality of image capture devices are each configured to record audiovisual content; obtain data indicative of a point of view (POV), wherein the POV is selected via user input; determine, based on the data indicative of the POV, a corresponding viewpoint in the virtual representation of the location; and update the virtual representation of the location with an image captured by an image capture device in the plurality of image capture devices at a current time.

The system of the preceding paragraph can include any sub-combination of the following features. In some aspects, the techniques described herein relate to a system, wherein the plurality of image capture devices includes a microlens camera; the system, wherein the microlens camera includes a plurality of lenses coupled together to form one of a sphere, a cylinder, a three dimensional ellipse, or a cone; the system, wherein the user input indicates a first direction at which to move within the virtual representation of the location, and wherein the image depicts a portion of the location in a direction of the first direction In some aspects, the techniques described herein relate to a system for capturing a scene, the system including: a plurality of cameras, wherein each camera in the plurality of cameras is distributed throughout a location, wherein one or more subsets of cameras are located on a vector, wherein each camera in the plurality of cameras is configured to capture an image at a predetermined frame per second value, wherein the interval distance between adjacent cameras is determined by the speed of travel of the user and the effective frame rate of the system, wherein the one or more subsets of the plurality of cameras is arranged in an array along a line; and an image processing system including a hardware processor and in networked communication with the plurality of cameras, the image processing system configured with computer-executable instructions that, when executed by the hardware processor, cause the image processing system to integrate output from the plurality of cameras with a perspective view of a virtual representation of the location.

The system of the preceding paragraph can include any sub-combination of the following features: the system, wherein each camera in the plurality of cameras is fixed in position, wherein each camera is attached to a pole, a string, or a wall wherein each camera in the plurality of cameras captures a fixed field of view; the system, wherein each camera in the plurality of cameras is immobile, wherein each camera is attached to a pole, a string, or a wall, wherein the pole, the string, or the wall are immobile, wherein each camera in the plurality of cameras captures a fixed field of view; the system, wherein each camera in the plurality of cameras is attached to one or more poles; the system, wherein the plurality of cameras is mounted on a string; the system, wherein each camera in the plurality of cameras is attached to one or more drones, wherein the one or more drones are configured to fly in formation, wherein the one or more drones are equipped with GPS, wherein the system is configured to maintain the relative position of the one or more drones, wherein the one or more drones are configured to fly within a predefined space; the system, wherein the line wherein the one or more subsets of the plurality of cameras are located is a horizontal or vertical line; the system, wherein the system is configured for use within a retail environment, wherein the retail environment is a grocery, wherein the system is configured to store inventory status in an inventory system, wherein the system is configured to allow a user to observe the retail environment; the system, wherein the system is configured for use within a warehouse environment wherein the system is configured to store inventory status in an inventory system, wherein the system is configured to allow a user to observe the warehouse environment; the system, wherein the system is configured to identify and track items on shelves of the retail environment; the system, further including an object tracking system, the object tracking system configured with computer-executable instructions that, when executed by the hardware processor, causes the object tracking system to select an object for tracking; the system, further including a natural language processing system, in networked communication with the object tracking system, the natural language processing system configured with computer-executable instructions that, when executed by the hardware processor, causes the object tracking system to select the object for tracking; the system, wherein the system is configured for use on a vehicle; the system, wherein the system is configured for use on a bus, car, plane, train, or boat; the system, wherein the system is configured to display a user icon, wherein the user icon corresponds to the position of a user viewing the scene; the system, wherein the user icon further represents user input from the user viewing the scene, wherein the user input includes speaking, gesture, body position, or effects selected from a user menu; the system, further including an object removal system, in networked communication with the object tracking system and the image processing system, the object removal system configured with computer-executable instructions that, when executed by the hardware processor, causes the object tracking system to select one or more objects for tracking and removal, wherein the object removal system is configured to remove one or more tracked objects from the scene, wherein the image processing system is configured to generate an object corrected output, wherein the one or more tracked objects are selected from a list including: a person, shopping carts, vehicles, or cars.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
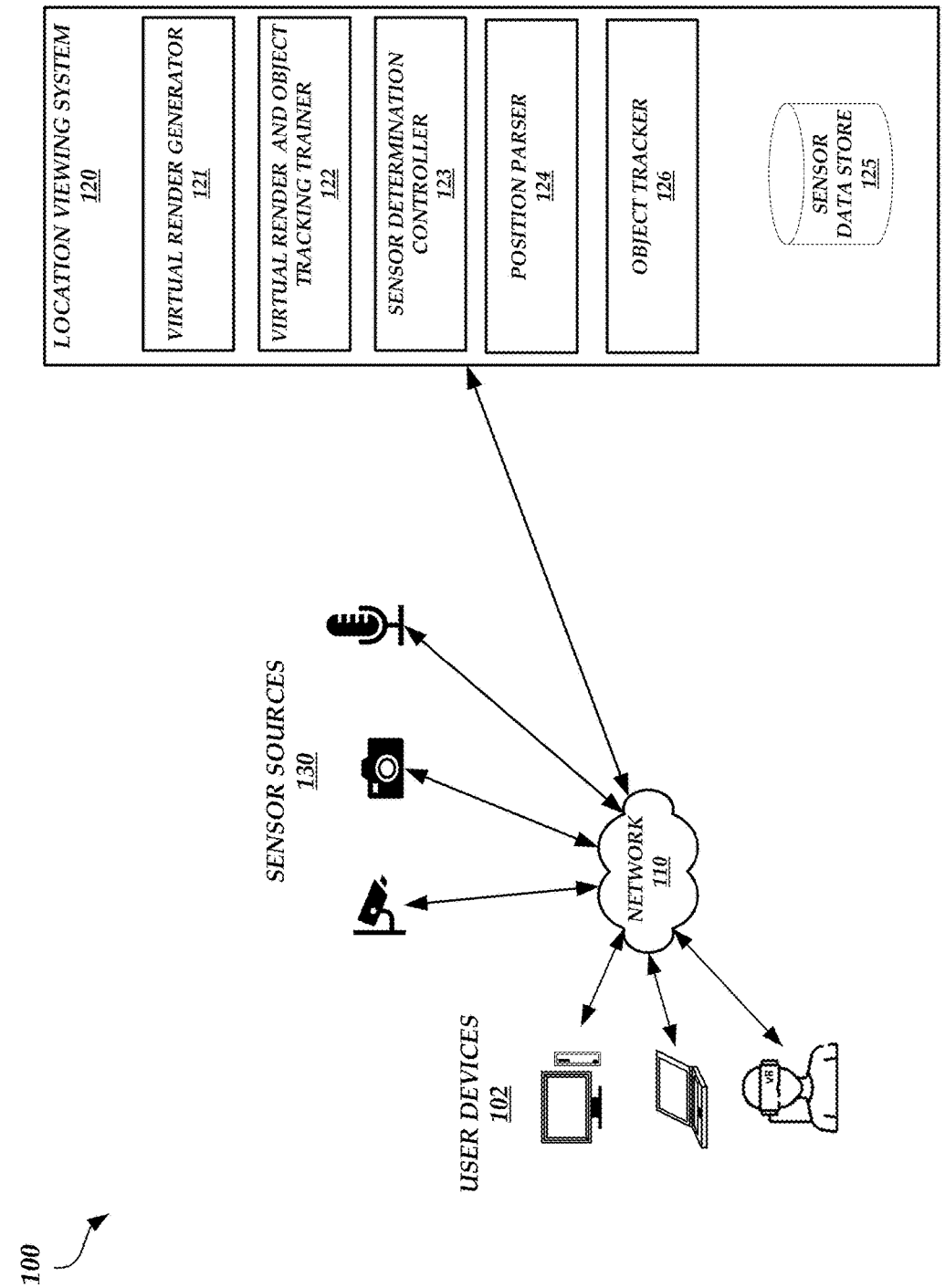
FIG. 1 is a block diagram of an illustrative operating environment in which a location viewing system uses data from multiple sources to visualize a remote location.

As discussed above, it can be difficult for users to navigate between different locations or to view real-time changes at various locations in existing virtual environments and platforms. For example, existing virtual environments and platforms often capture images for display in the virtual environment using a moving vehicle. If a user wishes to navigate from point A to point B, the images displayed to the user correspond to images captured by the moving vehicle as the moving vehicle traveled from point A to point B (or from point B to point A). As a result, any obstructions (e.g., shadows, blocking of view, etc.) caused by the moving vehicle or another object that may be in motion at that location (e.g., another vehicle, a pedestrian, an animal, etc.) in viewing a particular location may be present each step of the way as the user navigates from point A to point B. In addition, the position from which the moving vehicle can capture an image is limited (e.g., one lane of a street), which therefore limits the view presented to the user as the user navigates from point A to point B. As the user navigates from point A to point B, the user may be interested in viewing street signs, the view from a particular lane, the view at a particular height, and/or the like, but the limitations in where a moving vehicle can capture an image may prevent the user from being able to view these points of interest.

As another example, existing virtual environments and platforms often display images to users that were captured at some time in the past. While some locations may not change often, other locations may change on a monthly, weekly, daily, etc. basis (e.g., construction sites, event sites, schools, parking lots, etc.). Because existing virtual environments and platforms capture and display historical images to users, users are unable to understand how a location may look or appear in real-time. In fact, because existing virtual environments and platforms are often limited to displaying historical images, it may not be possible for existing virtual environments and platforms to present to users other real-time information, including audiovisual data, smells, or other sensory inputs (e.g., real-time audio at a location (e.g., where real-time audio may include audio captured within a few seconds of a time at which the user hears the audio), real-time smells at a location (e.g., where real-time smells may include smells presented to a user that match detected smells at a location within a few seconds of when the smells are presented to the user), etc.).

To that end, systems, methods, and techniques relating to accurately capturing a space (which may include a specific space, locale, or place), including relevant three-dimensional metadata, may allow for more faithful and accurate reproductions of the space or locale, and may allow users to have a more realistic, immersive audiovisual experience while traveling through a virtual environment that represents the space or locale. In some embodiments, the system, methods, and techniques described herein allow for real-time or near real-time rendering of a real space. In some embodiments, the system, methods, and techniques described herein allow for a faithful reproduction (e.g., a realistic reproduction, a reproduction based on actual images, etc.) of a previously recorded real space (e.g., an historical version of the real space) as well. Thus, the present system as described comprises systems of cameras, lenses, user-input devices, picture/audio/video/haptic presentation devices, and a software system to process input data and provide appropriate output to simulate a space to users using the picture/audio/video/haptic presentation devices. Thus, the system, methods, and techniques disclosed herein resolve the technical deficiencies of existing virtual environments and platforms discussed above, and provides a solution for enabling a user to be present and move around in a real space in any direction and speed, to visualize the real space and be present virtually, and interact with objects and people with haptic feedback.

As described herein, systems comprising a series of cameras and lenses allow for frame capturing and reproduction of viewpoints comprising a space, the cameras and lenses configured to capture frames at particular FPS speeds, and the cameras and lenses located at varying distances. To a user accessing the system herein, will be able to travel along a virtual representation of the real space, interact with, and track moving objects. Moreover, a user accessing the system will be able to interact with other remote users accessing the same space, and express motion, emotion, and other contextual gestures to the other remote users using an embodiment of the system described herein. The movement of a user traversing the virtual representation of the real space may be limited by the camera series set up within the real space, though methods described herein allow for pixel averaged approximations of viewpoints where cameras are not present, but alternate cameras are present, with frames from alternate cameras used to generate intermediate viewpoints within a space.

The present disclosure generally relates to a system for realistic, immersive audiovisual experiences, where a user is able to travel and observe virtually a rendered space, the rendered space created by capturing in real-time (e.g., capturing within a few nanoseconds, microseconds, milliseconds, etc. of the captured subject matter being presented to a user) or near real-time (e.g., capturing within a minute, 10 minutes, 1 hour, etc. of the captured subject matter being presented to a user) an existing space using a system of cameras and/or sensors. Particularly, the user may travel virtually through a real space in a flow of motion in that space (e.g. a mall, store, room, theater, performance hall, conference center, or street) in real-time, all from a remote location. The technology described herein uses a system of cameras, sensors, and/or video capture devices positioned at set time and/or space intervals to cover a given space. Image capture of a space may occur at an appropriate frequency of frames per second (e.g., 24 frames per second (fps), 30 fps, 60 fps, 120 fps, 240 fps, etc.) to enable a reproduction of an uninterrupted audiovisual experience for the user.

As used herein, a virtual representation or reproduction of a "real space" or a "rendered space," a "reproduced space," or a "simulated space" is a representation of a physical location that has been constructed by a system using one or more images or other audiovisual data captured at the physical location and that is viewable by a user and/or can be sensed by a user at any location (e.g., at the physical location, at a location remote from the physical location, etc.). The physical location may be a street, a street corner, a building, a structure, a town, a city, a zip code, a county, a river, a lake, an ocean, and/or any other place that can be defined by a boundary (e.g., a parcel boundary, a geographic boundary, a set of coordinates, one or more walls, etc.).

For example, while wearing a headset that displays images (e.g., a virtual reality headset, an augmented reality headset, etc.) or viewing a screen that displays images, the user may have the ability to navigate virtually to view a physical location at the same speed as, at a faster speed than, or at a slower speed than a moving object present at the physical location; to view a physical location while remaining at the same position; to view a physical location while moving in a direction opposite from a direction in which an object at the physical location is moving; to view a physical location while moving in any direction; to view a physical location at ground level or at one or many altitudes above ground level; to view a physical location as the physical location existed at a historical time, and/or the like. The instructions associated with the remote user for informing the system as to how the user wants to move or navigate within the virtual space can be obtained from the user in the form of data input from a keyboard, a touchscreen, a mouse, a microphone that detects voice commands, one or more sensors (e.g., accelerometers, gyroscopes, piezoelectric devices, motion sensors, smart watches, etc.) connected to an appendage or clothing of the user (e.g., the hand of the user, the foot of the user, a glove worn by the user, a face of the user, a head of the user, eye glasses worn by the user, a jacket worn by the user, etc.), one or more cameras that detect user gestures, and/or the like.

Use cases for the system described herein can include a user watching or tracking a moving object on a street, a user virtually visiting a shopping mall or store, a user virtually experiencing an underwater environment, a user virtually visiting an amusement park, a user virtually experiencing airspace, and/or the like. The system described herein can be implemented for use in a variety of contexts, including gaming, teleconferencing, virtual reality, augmented reality, and/or the like. Optionally, the system described herein can capture 360 degree images using 360 degree spatial cameras and/or audio systems, thereby creating a realistic immersive experience for a remote user that allows the user to experience a location as if the user is physically present at and navigating the location in real-time. In some embodiments, the system can present a contemporaneous (e.g., real-time) or near contemporaneous (e.g., near real-time) representation of a real space to a user. In other embodiments, the system can present a recorded, archived representation of a real space to the user.

The system described herein can also include object tracking features, which track objects or subjects through time and space. For example, object tracking software can be implemented by a location viewing system described herein to identify specific stationary or moving objects (e.g., a vehicle, a person, an animal, a retail item, or any other type of object) in one or more images captured by one or more cameras. Object tracking can further approximate movement of tracked objects when objects leave a particular field of view of a camera, or are otherwise occluded in a scene. Therefore, an object traveling with a consistent direction and/or velocity can be accurately predicted to re-emerge at a particular location. In some embodiments of the present system, the movement of an object being followed by a user can be captured using a series of cameras instead of a single camera, where the series of cameras have differing fields of view. A tracked object can therefore be continuously tracked by a series of cameras in a real space where suitable sensors are present. In some embodiments, tracked objects may be identified by the system, and a user accessing the system may travel from their initial starting point to a second point where the user may view the tracked object. Thus, in some embodiments, appropriate cameras and lenses are selected to follow, or navigate a user to, a tracked object.

The aforementioned advantages, among others, are addressed in at least some embodiments by the disclosed methods, systems, and techniques for realistic, immersive audiovisual experiences. More specifically, the features disclosed herein address deficiencies that exist in existing virtual environments and platforms by allowing for the rendering of a three-dimensional environment or space designed such that users can navigate virtually one or more locations in a realistic, intuitive manner while viewing and/or sensing (e.g., hearing, smelling, etc.) the location in real-time as if the user is physically present at the location at a current time.

The present method and systems allow for obtaining 360 degree pictures and/or videos and utilizing techniques that stitch multiple images together to provide a realistic visualization of a space. In some embodiments, such a system can be used to recreate, for example, a conference room in which people from different remote locations can participate by using 3D emojis or icons of respective participants in real-time, enabling an experience of being in the same room, participating in a meeting, and/or collaborating in work together, and wherein the emojis or icons were previously assigned to identify individual users.

In some embodiments, the systems, methods, and techniques described herein also enable a user the freedom to choose one's point of view from the surroundings, to aid in remote inspections of various types of spaces. For example, manufacturing or construction sites, day care centers and schools, and/or other places where a user may navigate through a space by choosing their own perspective can be represented in the virtual environment, enabling an interactive and immersive remote site experience as if the user were personally there. The system described herein may enable a user to conduct various types of video meetings, such as video meetings that include virtual reality (VR), augmented reality (AR), spatial audio, and/or the like.

The ability to recreate, approximate, or otherwise incorporate three-dimensional metadata, including information from one or more angles captured using one or more imaging devices, therefore allows a user to effectively tour a space, such as a street, mall, or shop, in real-time, move around the space in any direction as the user desires, and all from a location remote from the space being toured. Such a system may enable a remote user to experience traveling in a space (e.g., a road or a mall), as if the user is actually moving with the flow of the cars, walking on the sidewalk, walking adjacent to other individuals at the mall, and/or the like at the space being experienced.

These and other aspects of the disclosure will now be described with regard to certain examples and embodiments, which are intended to illustrate but not limit the disclosure. Although the examples and embodiments described herein will focus, for the purpose of illustration, on specific algorithms and data parsing, one of skill in the art will appreciate the examples are illustrative only, and are not intended to be limiting.

The foregoing aspects and many of the attendant advantages of this disclosure will become more readily appreciated as the same become better understood by reference to the following detailed description, when taken in conjunction with the accompanying drawings.

Time and Space System

FIG. 1 is a block diagram of an illustrative operating environment 100 in which a location viewing system 120 uses sensor data and/or artificial intelligence to render and present a video stream, sequence of images, or other sensory output to user devices 102. The location viewing system 120 further includes a virtual render generator 121, sensor determination controller 123, object tracker 126, position parser 124, as well as a sensor data store 125. In some embodiments, the location viewing system 120 further includes a virtual render and object tracking trainer 122. The location viewing system 120 is configured to communicate with network 110 to provide sensor data by a plurality of sensor sources 130. Moreover, user devices 102 are configured to request and receive output from the location viewing system 120. As can be appreciated herein, output sent to user devices 102 can include, but are not limited to, video, images, audio, tactile, atmospheric, ambient, and other outputs, which can be pulled from sensor sources 130, sensor data store 125, or preset by the location viewing system 120.

The location viewing system 120 can be a computing system configured to collect and generate a video stream, a sequence of one or more images, and/or another type of sensory output (e.g., audio, smell, touch, vibration, atmospheric readings, etc.) to be displayed or outputted on any number of user devices 102. As described herein, generation of the video stream, sequence of image(s), or other type of sensory output can include collecting sensor data from a plurality of sensor sources 130, object tracking, and/or using machine learning techniques mediated in part by the virtual render and object tracking trainer 122. For example, when using machine learning techniques, the virtual render and object tracking trainer 122 can obtain sensor data, generate or train a model using the sensor data, apply a version of the sensor data as an input to a trained artificial intelligence model (e.g., a virtual render machine learning model), and correct or supplement a resulting video stream, sequence of image(s), or other type of sensory output to be displayed or outputted on any number of user devices 102 based on the output of the trained artificial intelligence model. In some embodiments, the location viewing system 120 can receive from a user device initial position data, desired movement data, and/or object tracking data, and using the sensor determination controller 123, position parser 124, and/or object tracker 126, generate a video stream, sequence of image(s), or other type of sensory output for output with virtual render generator 121.

The location viewing system 120 may be a single computing device, or it may include multiple distinct computing devices, such as computer servers, logically or physically grouped together to collectively operate as a server system. The components of the location viewing system 120 can each be implemented in application-specific hardware (e.g., a server computing device with one or more ASICs) such that no software is necessary, or as a combination of hardware and software. In addition, the modules and components of the location viewing system can be combined on one server computing device or separated individually or into groups on several server computing devices. In some embodiments, the location viewing system 120 may include additional or fewer components than illustrated in FIG. 1.

The location viewing system 120 may include various modules, components, data stores, and/or the like to provide the image, video, and/or other sensory output generation functionality described herein. For example, the location viewing system 120 may include a virtual render generator 121, sensor determination controller 123, position parser 124, object tracker 126, sensor data store 125, and optionally a virtual render and object tracking trainer 122. The following description of the location viewing system 120 is described herein with respect to outputting visual content, but this is not meant to be limiting. For example, the location viewing system 120 can output other types of sensory data (e.g., audio, smell, touch, vibration, atmospheric readings, etc.) measured by the sensor source(s) 130 at locations corresponding to one or more positions that the user has selected or is viewing.

The virtual render generator 121 can generate a video stream and/or sequence of image(s) for output to one or more user devices 102 using sensor data from sensor sources 130 or sensor data store 125. Sensor data can include various types of output or measurements, such as video, images, audio, atmospheric (e.g., temperature, humidity, pressure, gravity, etc.), and/or other sensor data that can be captured. The video stream and/or sequence of image(s) generated by virtual render generator 121 corresponds to the spatial orientation, direction, speed of travel, and/or object tracking requested by user devices 102, and is generated from a plurality of sensor sources 130 placed throughout a real space. To generate the video stream and/or sequence of image(s) sent to user devices 102, the virtual render generator 121 first receives a request for a video stream, an image, or a sequence of images from user devices 102, the request comprising an initial position within a space (e.g., latitudinal and longitudinal coordinates, a street address, a name of a location, an identifier corresponding to a physical location, an identification of a sensor at a particular location, etc.), and optionally, a desired orientation, direction of travel, rate of travel, an object to track, and/or other inputs corresponding to movement or other interaction within a defined space.

After the location viewing system 120 receives a request for the video stream, the image, or a sequence of images, the position parser 124 identifies the initial position within the space identified in the request, and optionally, a direction and rate of travel identified in the request. From the initial position as identified by position parser 124, the sensor determination controller 123 selects one or more sensor sources 130 that have a location corresponding to the initial position or that capture one or more measurements (e.g., sensor measurements, such as images, temperature readings, humidity readings, pressure readings, etc.) at a location corresponding to the initial position, and optionally, one or more other inputs corresponding to movement or other interaction within a defined space. The sensor determination controller 123 can then store the sensor data collected from the selected sensor sources 130 in sensor data store 125. Alternatively, the sensor determination controller 123 may store sensor data measured or captured by the sensor source(s) 130 in the sensor data store 125 as the sensor data is measured or captured, regardless of whether a request has been received to view a video stream, an image, or a sequence of images. The virtual render generator 121 can then retrieve the sensor data from the sensor data store 125, and analyze and/or splice the sensor data into a resulting video or image output. Optionally, multiple sensor data outputs are analyzed by virtual render generator 121, and the resulting video or image output is comprised of a composite of multiple sensor data outputs as determined by the location viewing system 120. In one embodiment, the virtual render generator 121 and/or the virtual render and object tracking trainer 122 may use a trained artificial intelligence model (e.g., a trained machine learning model) to correct, alter, or otherwise modify the resulting video or image output. For example, the virtual render and object tracking trainer 122 can train the artificial intelligence model using training data, such as the training data described herein. The virtual render generator 121 and/or the virtual render and object tracking trainer 122 can apply the sensor data as an input to the trained artificial intelligence model, compare the resulting video output generated by the virtual render generator 121 to an output of the trained artificial intelligence model, and render changes to the resulting video or image output based on the comparison (e.g., modify the resulting video or image output to replace one or more frames or images included in the resulting video or image output with one or more frames or images output by the trained artificial intelligence model) to create a corrected video or image output. The virtual render generator 121 and/or the virtual render and object tracking trainer 122 can then transmit either the resulting video or image output or the corrected video or image output (e.g., when using artificial intelligence) to a user device 102. As can be appreciated, the sensor data from selected sensor sources 130 can include values captured or measured in real-time, in near real-time, or from any time (e.g., where such sensor data may be stored in the sensor data store 125 if the values captured or measured are historical (e.g., not real-time or near real-time values)).

The object tracker 126 can be configured to identify one or more objects in one or more images captured by sensor sources 130 (e.g., cameras). For example, the request from a user device 102 to view a video stream or sequence of image(s) corresponding to an initial position may include an identification of an object to track. The identification can be in the form of a textual description of the object, a selection of an object from a menu of objects displayed by the user device 102, an identification of an object via a user gesture, an identification of an object via a voice command, an identification of an object via a button selection, and/or the like. The identification in the request can be forwarded by the location viewing system 120 to the object tracker 126. As another example, after the user device 102 requests a video stream or sequence of image(s) corresponding to an initial position and the location viewing system 120 provides the requested video stream or sequence of image(s), the user may identify an object in the displayed video or image. The user can provide an input to the user device 102 (e.g., a gesture input, a button selection, a menu item selection, an annotation drawn on a screen, a touch input, etc.) to select the identified object. The image or frame of the video in which the selection is made can be transmitted by the user device 102 to the object tracker 126. Alternatively, the virtual render generator 121 can provide the frame or image to the object tracker 126 based on an indication of the selection received by the virtual render generator 121 from the user device 102.

The object tracker 126 can then apply image processing to the image or frame provided by the user device 102 or an image captured by a sensor source 130 at a location corresponding to the initial position in the request to identify characteristics of the object (e.g., an outline of the object such as via edge detection applied to the image or frame, a color or shape of the object such as via edge detection applied to the image or frame and pixel analysis of pixels that fall within the identified edges or boundaries, an identification of the object via application of the image or frame as an input to a trained object detection artificial intelligence model, etc.). If the object is moving, the object may be captured by one or more other sensor sources 130 in addition to a sensor source 130 that captured a video or image displayed by the user device 102 at some time after the video or image displayed by the user device 102 was captured. Thus, once characteristics of the object are identified, the object tracker 126 can retrieve frames of video or images from the sensor data store 125 that were captured by sensor sources 130 other than the sensor source 130 that captured a video or image displayed by the user device 102, and perform the same or similar image processing on the retrieved frames or images to attempt to identify which other frame(s) or image(s), if any, also depict the same object with the identified characteristics. In some embodiments, the object tracker 126 may limit the frame(s) or image(s) from the other sensor sources 130 that are analyzed to those frame(s) or image(s) captured by sensor source(s) 130 that are within a threshold distance (e.g., 5 feet, 50 feet, 100 feet, 200 feet, 1 mile, etc.) of the location of the sensor source 130 that captured the video or image displayed by the user device 102 such that the object tracker 126 reduces the number of false positive detections (e.g., reduces the number of times that an object in a frame or image is identified by the object tracker 126 as being the same as the selected object, but where the identified object is actually different than the selected object and/or cannot be the selected object given the distance between the two sensor sources 130 that captured the respective frame(s) or image(s)). The object tracker 126 can provide a copy of any frame(s) or image(s) that depict the same object to the virtual render generator 121.

The virtual render generator 121 can obtain the frame(s) or image(s) that depict the same object from the object tracker 126 and analyze the position from which and/or time at which the frame(s) or image(s) were captured to determine which frame(s) or image(s) to send to the user device 102 for display. For example, the location viewing system 120 may cause the user device 102 to display frame(s) or image(s) at a certain frame per second (e.g., 1, 12, 24, 30, 60, 120, etc.). In other words, the location viewing system 120 may cause the user device 102 to display N number of frames or images every second, where N represents the frame rate and can be any integer (e.g., 1, 12, 24, 30, 60, 120, etc.). A first frame or image displayed by the user device 102 (e.g., the frame or image at which the user made the object tracking selection) may correspond to a time 0. A second frame or image displayed by the user device 102 may then correspond to time 1/N, a third frame or image displayed by the user device 102 may then correspond to time 2/N, a fourth frame or image displayed by the user device 102 may then correspond to time 3/N, and so on. The virtual render generator 121 may attempt to determine a frame or image captured at time 1/N that the object tracker 126 identified as depicting the object. If the virtual render generator 121 determines a frame or image that was captured at time 1/N that the object tracker 126 identified as depicting the object, then the virtual render generator 121 may cause the user device 102 to display the frame or image captured at time 1/N subsequent to the display of the initial frame or image displayed by the user device 102. Optionally, the virtual render generator 121 may identify a position or location from which the frame or image captured at time 1/N was captured, compare the identified position or location with the position or location from which the frame or image currently displayed by the user device 102 was captured, and cause the user device 102 to display the frame or image captured at time 1/N if the distance between the two positions or locations is less than a threshold distance (e.g., 1 feet, 5 feet, 10 feet, or any other distance for which it would be reasonable for the object to move within a 1/N time interval). If the virtual render generator 121 identifies two or more frames or images captured at time 1/N that depict the object, the virtual render generator 121 may cause a frame or image closest to the object to be displayed by the user device 102, may cause a frame or image that captures the object from the same angle or distance as the previous frame or image to be displayed by the user device 102, may cause a frame or image that depicts the object in a center-most location of the frames or images to be displayed by the user device 102, may cause a frame or image captured by the same sensor source 130 as the previous frame or image to be displayed by the user device 102, may cause a frame or image captured by a sensor source 130 at an angle selected by a user (e.g., 45 degrees, 90 degrees, 180 degrees, etc.) to be displayed by the user device 102, and/or the like.

If no frame or image captured at time 1/N (e.g., a current time) is determined to depict the object (or no frame or image captured at time 1/N (e.g., a current time) that was captured within the threshold distance of the currently displayed frame or image is determined to depict the object), then the virtual render generator 121 can perform an analysis to determine whether the object is hidden from view of a sensor source 130 but is otherwise within a space defined by the sensor sources 130 (e.g., a space that is visible to and can be captured by the sensor sources 130) or whether the object has exited the space defined by the sensor sources 130. For example, the virtual render generator 121 can determine a speed or rate of movement of the object based on previous frame(s) or image(s) that depicted the object and the distance(s) between each sensor source 130 that captured the previous frame(s) or image(s). In particular, the virtual render generator 121 can determine the speed or rate of movement per second to be a distance between two sensor sources 130 that captured consecutively displayed frames or images depicting the object multiplied by N (e.g., the number for frames or images displayed per second). Because objects can move at variable speeds, the virtual render generator 121 can repeat this operation one or more times to determine multiple speeds or rates of movement, and can average the determined multiple speeds or rates of movements to identify an average speed or rate of movement. The virtual render generator 121 can then estimate where the object should be present at a current time given the speed or rate of movement or the average speed or rate of movement. If the virtual render generator 121 estimates that the object should be depicted in a frame or image captured by a particular sensor source 130, then the virtual render generator 121 may cause the user device 102 to display the corresponding frame or image captured by the particular sensor source 130 even though the object may not be visible. If the virtual render generator 121 estimates that the object has moved to a location that is not captured by any sensor source 130, then the virtual render generator 121 may cause the user device 102 to display a notification identifying that the object is now out of view.

The virtual render generator 121 can repeat this process for each time interval (e.g., each 1/N time interval) after the user selects an object to track until the user indicates via the user device 102 that the user no longer wishes to track the object (e.g., via a user gesture, a button input, a menu selection, a touch selection, a voice command, etc.), the user indicates via the user device 102 that the user wishes to track another object (e.g., via a user gesture, a button input, a menu selection, a touch selection, a voice command, etc.), or the object is no longer visible in any frame or image captured by the sensor sources 130 (e.g., the object has moved to a location outside the space defined by the sensor sources 130). The virtual render generator 121 can either cause a user device 102 to display each individual frame or image identified as depicting the object by transmitting each individual frame or image to the user device 102, or can stitch together multiple frames or images identified as depicting the object into a video or a sequence of images and cause a user device 102 to display each individual frame or image by transmitting the video or sequence of images to the user device 102. In other words, the virtual render generator 121 can stream frames or images to the user device 102 or generate and transmit a single video or sequence of images or sets of videos or sequences of images to the user device 102. Optionally, the virtual render generator 121 may annotate some or all of the frames or images to identify a location of the object within the respective frame or image (e.g., insert a bounding box that surrounds the object, highlight or change the color of the object, apply a text label adjacent to the object, etc.).

The virtual render and object tracking trainer 122 can train the object detection artificial intelligence model (e.g., neural network, machine learning model, etc.) using object detection training data. The object detection training data can include one or more images that are labeled to identify one or more objects depicted therein and/or that are labeled to identify one or more objects that are not depicted therein. Once trained, the object detection artificial intelligence model can receive, as an input, a frame or image and output an indication of one or more objects detected within the frame or image as a result. In order to determine the characteristics of an object selected by a user, the object tracker 126 can apply a frame or image as an input to the trained object detection artificial intelligence model, where the frame or image is the frame or image displayed by the user device 102 when the user selects an object to track. The trained object detection artificial intelligence model may output an indication of one or more objects detected within the frame or image, and the object tracker 126 can compare the location of the detected object(s) with the location within the frame or image where a user made a selection, can compare the characteristics of the detected object(s) with the characteristic(s) selected by a user, and/or the like. If the object tracker 126 detects a match (e.g., a detected object matches a location where a user made an object selection, a characteristic of a detected object matches a characteristic selected by a user, etc.), then the object tracker 126 may determine that the object selected by the user is the matching detected object, where the matching detected object may be defined by one or more characteristics. The object tracker 126 can then apply subsequent frames or images as an input to the trained object detection artificial intelligence model, where each application results in the trained object detection artificial intelligence model outputting an indication of one or more objects detected in the respective frame or image. For each output, the object tracker 126 can then compare the characteristic(s) of the object selected by the user with the characteristic(s) of each detected object, and determine which detected object has the same or similar characteristic(s) as the selected object. The object tracker 126 may determine that the detected object that has the same or similar characteristic(s) as the selected object is the selected object, and cause a user device 102 to display a frame or image that depicts the detected object in a manner as described herein.

By fitting a location, such as a street or a mall, with appropriate cameras (e.g., sensor sources 130), enabled with audio or spatial audio and video at appropriate distances and positions, the cameras can capture images and/or videos with one or more viewing angles (e.g., 120 degrees, 180 degrees, 360 degrees, etc.) periodically (e.g., every nanosecond, every millisecond, every second, every minute, 30 times a second, 60 times a second, 120 times a second, etc.). The images and/or videos obtained by virtual render generator 121 from multiple cameras located along a street or in the space within a mall can be presented to a user via a user device 102 in sequence as the images and/or videos are obtained, or stitched together in a sequence by virtual render generator 121 in such a way that enables the user to visualize and be immersed in the real-time experience of the happenings on the street or the mall (or other location) remotely through the user device 102.

A user can also enable one or more features via a user device 102 that allows the user to move virtually through a real space in tandem with a moving object (e.g., a car within the flow of traffic, a pedestrian, an animal, etc.), thereby watching the scene on the street as the scene unfolds in real-time. In addition, the user can select an option via a user device 102 to travel inside, above, below, and/or to the side of a vehicle selected by the user that is depicted in the virtual rendering of the real space and/or can select an option of a speed at which the user would like to travel. To travel in this way, the location viewing system 120 can select and/or alter the series of cameras or other sensor sources 130 from which the images displayed by the user device 102 are obtained such that future images match the location(s) to which the user would like to travel and/or speed at which the user would like to travel.

In some embodiments, the features and services provided by the location viewing system 120 may be implemented as web services consumable via the communication network 110. In further embodiments, the location viewing system 120 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Thus, the present disclosure provides for the compilation of audiovisual data originating from a real space (e.g., a scenery) and captured by one or more pre-positioned sensor sources 130 (e.g., 1, 2, 3, etc. sensor sources 130, such as one or more cameras) located at a series of spatial distances. The audiovisual data may correspond to the motion of a moving object that is captured at a certain frames per second (FPS), such that the location viewing system 120 can generate a composite video output for display on a user device 102 that can produce a continuous audiovisual output that approximates the realistic motion of objects within the scenery in the view of the sensor sources 130. The user of the user device 102 can view the reproduced space as if the user is present and is participating in the scenery in real-time. In some embodiments, the scenery displayed to the user changes such that it appears, to the user, as if the user is propelled in tandem with a predefined or user-selected moving object. In some embodiments, the user is able to freely traverse and move relative to the reproduced space.

The operating environment 100 is also capable of enabling the user to enter a real space (e.g., a shopping mall or a shop) virtually via a user device 102, virtually walk around within the real space, and provide one or more inputs other than directional or position-based inputs. For example, a user may provide an input indicating a desire to shop for an item within a shop. The shop may have one or more sensor sources 130 pre-installed at one or more positions within the shop. The user, via a user device 102, may provide a position-based input to navigate to a particular location within the recreation of the shop. The user may also provide one or more further inputs to the location viewing system 120 via the user device 102 to select a specific good or item with which to shop or interact. Within the context of a shopping mall, for example, a plurality of sensor sources 130 (e.g., cameras, microphones, etc.) can be positioned within the mall or the shop space to such an extent that the remote user can walk around the shop virtually and visualize the items in real-time with complete three dimensional (3D) details of the items. Inputs obtained by the user device 102 can be generated using any available computing-based input device, such as a mouse, a cursor, a gesture-based input, haptic feedback, voice recognition, and/or the like. In some embodiments, voice recognition may include any number of computer voice input or natural language processing. Input devices can further include any user-based sensor device, such as a virtual reality controller, a haptic feedback vest or outerwear, or other peripheral devices used to provide interactivity within a virtual or computer environment.

In some embodiments, images and/or videos can be taken horizontally or vertically at different angles and/or at different heights by one or more sensor sources 130 to capture a 360 degree view of a space at which the sensor source(s) 130 are located. In some embodiments, the location viewing system 120 is able to apportion, slice, or cut the space within the purview of the camera system at different planes, such as the horizontal plane, vertical plane, or in any plane in 360 degrees. The location viewing system 120 enables the user to start at any place in the space, visualize the space at a defined starting position, and move along with the flow of the moving objects going forward or backward in time and space.

In some embodiments, the location viewing system 120 utilizes a plurality of static cameras positioned at various locations within a defined space. Each camera may capture sensor data, such as images and/or videos. The virtual render generator 121 can compile the sensor data obtained from the cameras, and cause the compiled sensor data to be displayed remotely on a computer screen, an audiovisual display, a VR viewing system, and/or any other type of user device 102.

Camera Systems

In some embodiments, a series of sensor sources 130, including cameras located within a given space are provided. In particular, sensor sources 130 comprising cameras can include still or video cameras configured to capture images at specified framerates, including from 1 FPS, to 60 FPS, to 200 FPS, and any other value in between or that exceeds 200 FPS.

For any space bounded by a series of sensor sources 130, and for any desired direction of travel (e.g., a vector), the number of sensor sources 130 may be determined using the desired FPS playback value, and the desired travel speed along the series of cameras. For example, where desiring to place cameras in a space and presenting a view to users at 24 FPS, following the average speed of objects within the space at 60 miles per hour (26.82 meters per second), a series of cameras may be placed equidistant from one another every 1.12 meters (112 cm) (26.82 mps/24 cameras) in order for the system to track and display to a user a 60 mile per hour object. A general formula for calculating the distance between successive cameras can be presented as D=S/F, where D is the distance between successive cameras, S is the speed of the user, and F is the desired FPS playback.

Therefore, sensor sources 130 can be placed at specific locations, including at regular or irregular intervals, at varying elevations and altitudes, and at varying angles and orientations, and can comprise cameras with varying fields of view (e.g., with lenses of varying focal lengths, with a field of view ranging from 1 to 360 degrees, or any value in between). When composited by virtual render generator 121, the sensor sources 130 can produce a seamless, continuous real-time immersive experience. In some embodiments, the series of cameras are placed at close space intervals, such as every centimeter, every meter, every 10 meters, every 15 meters, every 100 meters, every 1000 meters, or any value in between. The location viewing system 120 may be aware of the location, elevation, angle, and/or orientation of each sensor source 130, and can store this information in the sensor data store 125. As described herein, the location viewing system 120 can use the known location, elevation, angle, and/or orientation of each sensor source 130 to determine which frames or images to cause the user device 102 to display as a user navigates from an initial position to a final position.

In some embodiments, sensor sources 130 are placed statically within a space. In some embodiments, sensor sources 130 are placed on moving or moveable objects within a space.

Thus, the system of cameras can record video or images of a space, and the location viewing system 120 can generate and provide multiple different video or image outputs for different remote users. Each video or image output may depend on a respective user's desired movement or travel within a space, as indicated by input data received by the location viewing system 120 from the user device 102.

Figure 14A:
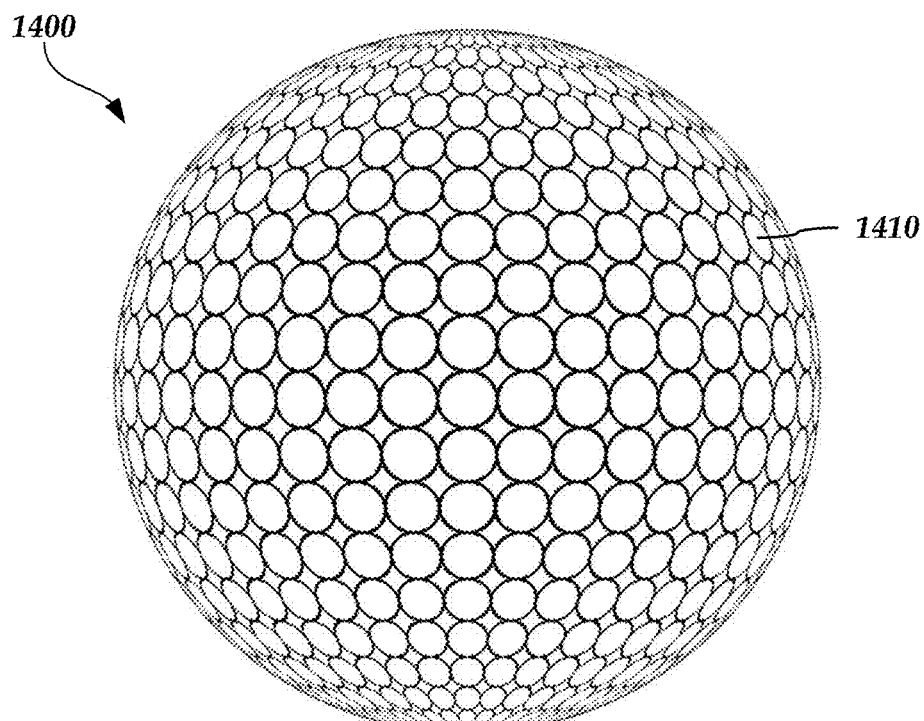
FIG. 14A depicts a microlens camera with lenses arranged spherically.
Figure 14B:
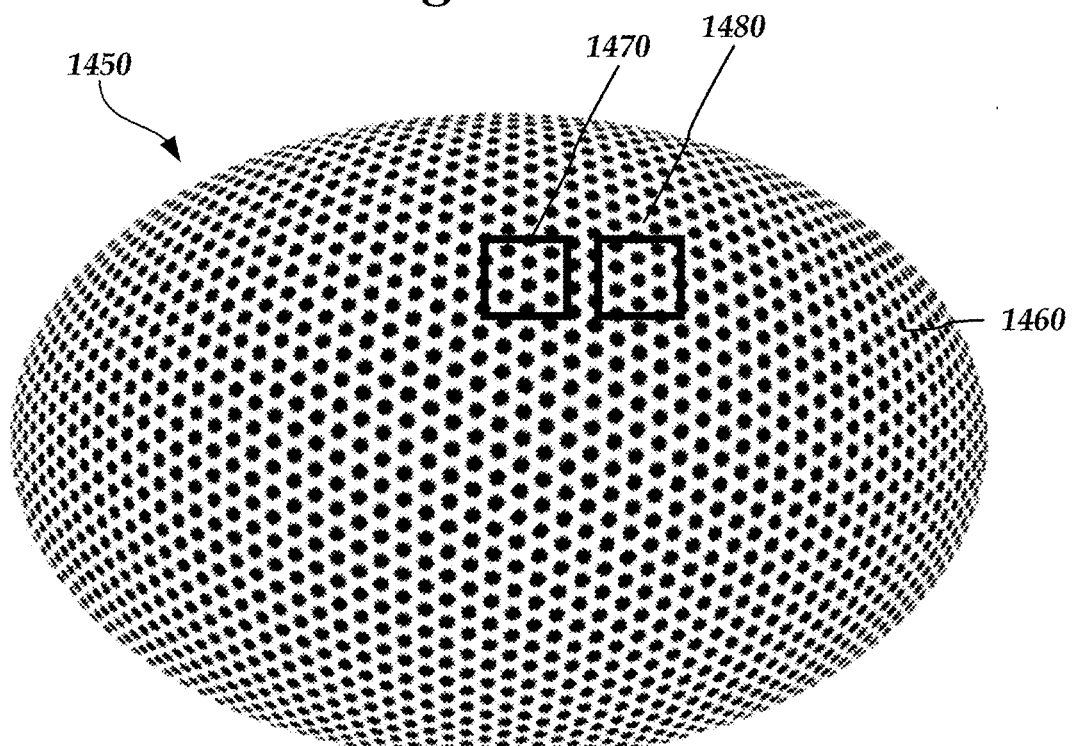
FIG. 14B depicts a microlens camera with lenses arranged elliptically.
Figure 15A:
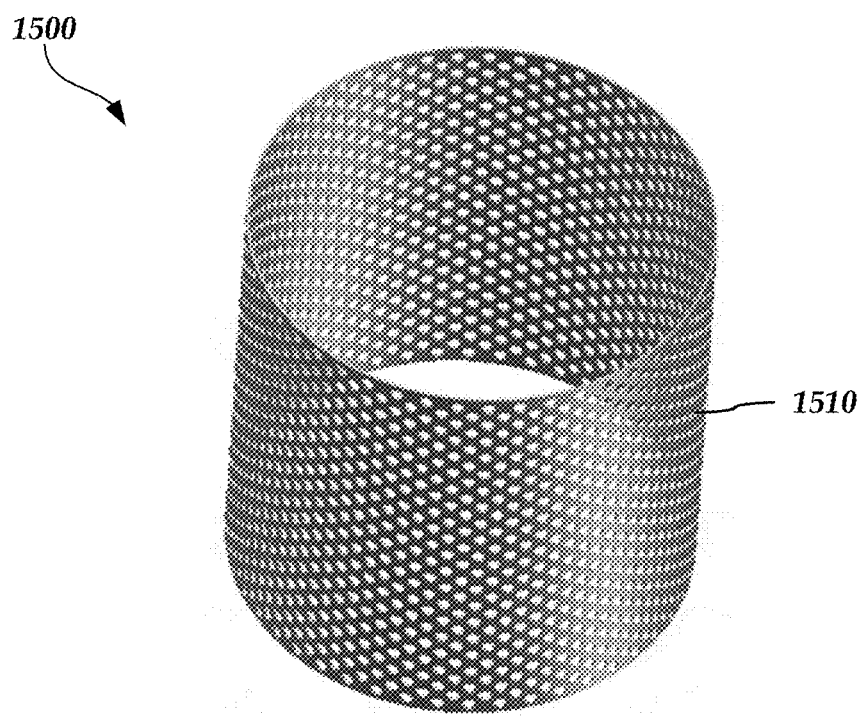
FIG. 15A depicts a microlens camera with lenses arranged conically.
Figure 15B:
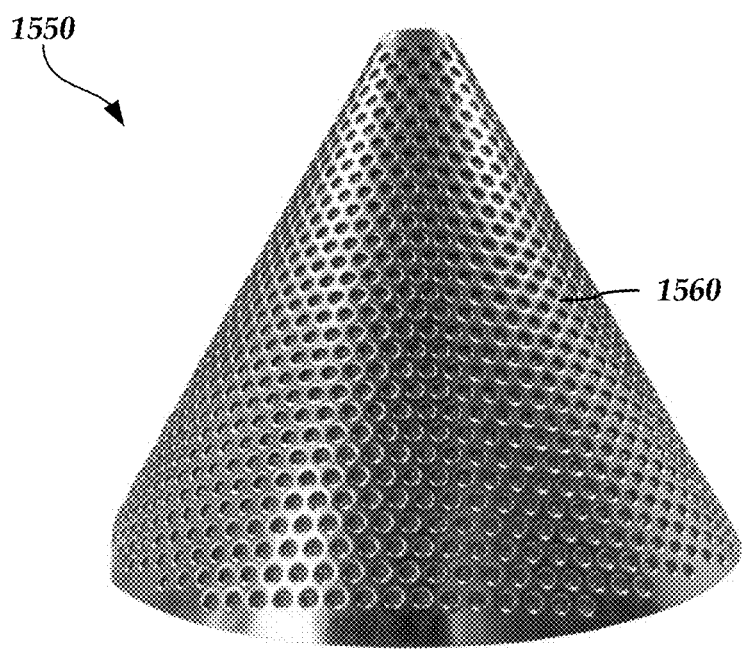
FIG. 15B depicts a microlens camera with lenses arranged cylindrically.

In some embodiments, sensor sources 130 can include cameras, including associated sensors and lenses, which can capture a specific viewpoint. Camera systems can include cameras with multiple sensors and multiple lenses, each with equivalent focal length, or each with differing focal lengths. In one embodiment, the sensor sources 130 include one or more microlens cameras. For example, a microlens camera may have a lens with a small diameter (e.g., less than 1 mm, less than 1 micrometer, less than 1 nm, etc.). The microlens camera can include a single lens or a series of lenses (e.g., 10 lens, 100 lens, 1000 lens, 10,000 lens, 100,000 lens, 1 million lens, etc.). In an embodiment in which a microlens camera includes multiple lenses, the lenses may be curved and/or coupled together to form a particular shape. FIGS. 14A-14B and FIGS. 15A-B display potential microlens camera arrangements, including where the lenses of the microlens camera are arranged spherically (FIG. 14A), elliptically (FIG. 14B), conically (FIG. 15A), or cylindrically (FIG. 15B). For example, microlens camera 1400 of FIG. 14A depicts multiple lenses 1410 that are coupled together to form a sphere. Microlens camera 1450 of FIG. 14B depicts multiple lenses 1460 that are coupled together to form a three-dimensional ellipse. With respect to FIG. 14B, arrangement 1470 represents a subset of multiple lenses that may be utilized by the microlens camera 1450 to capture a particular viewpoint. Arrangement 1480 represents an alternative subset of multiple lenses that may be utilized by the microlens camera 1450 to capture a different viewpoint compared to the viewpoint captured by arrangement 1480. Microlens camera 1500 of FIG. 15A depicts multiple lenses 1510 that are coupled together to form a cone. Microlens camera 1550 of FIG. 15B depicts multiple lenses 1560 that are coupled together to form a cylinder. With respect to FIGS. 14A-14B and FIGS. 15A-15B, any of the foregoing microlens designs may be oriented in any direction in space. For example, Microlens Camera 1450 may be oriented longitudinally so longest possible distance between the furthest two points on the ellipse is substantially horizontal, or latitudinally so that the longest possible distance between the furthest two points is vertical. The field of view of such lens arrangements may range from 1 degree to 360 degrees, or any value in between. For each microlens camera, each view from an individual lens can be combined by the virtual render generator 121 to generate a larger image (and larger field of view). Image processing techniques performed by the virtual render generator 121 can further process imagery captured by microlens cameras in order to display any captured subset of the entire field of view as a traditional orthogonal projection.

As described with respect to FIG. 14B, individual lens arrangements of a microlens camera may be selected to generate any arbitrary view. Arrangement 1470 represents a subset of multiple lenses that may be utilized by the microlens camera 1450 to capture a particular viewpoint. Arrangement 1480 represents an alternative subset of multiple lenses that may be utilized by the microlens camera 1450 to capture a different viewpoint compared to the viewpoint captured by arrangement 1480. For example, a microlens camera comprising 100 microlenses may select a subset of one or more microlenses (e.g. 1 microlens, 10 microlenses, 20 microlenses, 50 microlenses, 100 microlenses) to visualize and capture a viewpoint. In one embodiment, an arrangement (first subset) of microlenses on one or more cameras may be selected to capture a particular viewpoint, and a subsequent arrangement (subsequent subset) of microlenses on one or more cameras may be selected in order to capture a second viewpoint. Different arrangements of microlenses may therefore be selected by an embodiment of the present system to capture a series of viewpoints to approximate a changing viewpoint of a scene. As described herein with respect to selecting cameras, so too can specific microlens or microlens arrangements be selected by an embodiment of the present system to present a continuous video stream of a changing viewpoint when a remote user is observing a scene. Thus, steps described herein for selecting a subset of cameras may also apply to selecting a subset of microlenses, or for selecting a subset of microlenses and cameras, in order to present a continuous series of captured frames approximating a desired viewpoint as a user observes a space. In some embodiments, described herein is a set of one or more microlens cameras, wherein an initial subset of microlenses on a microlens camera are selected to capture a first viewpoint. Upon receiving a user input from a remote user, which may be the user turning their head, moving a controller joystick, or moving their eyes, or any other movement corresponding to a user input to change the current view, an embodiment of the system described herein may select a subsequent subset of microlenses on the one or more microlens cameras, and present to the user the viewpoint generated by the subsequent subset of microlenses, in order to accommodate the change in view as parsed by the system from the user input.

The desired position data that is parsed by position parser 124 can be obtained from a mouse, keyboard, joystick, head or eye movement, hand or finger gesture, or a garment comprising sensors worn by the user. Any input can be recognized by the location viewing system 120, and video or image output is generated by virtual render generator 121 that corresponds with a desired position and movement. The user may follow an object moving within a reproduction of a real space. On the other hand, the user may want to move in a direction and speed that they desire within a reproduction of a real space, independent of other moving objects in the real space.

The location viewing system 120 can also employ spatial audio and/or spatial video to simulate a true immersive experience. For example, the location viewing system 120 can process the sensor data captured by the sensor sources 130 using an audio signal processing technique to simulate a binaural, spatially determined audio signal that is then output to a user device 102. Audio output by the location viewing system 120 can therefore allow for positional sounds to be generated and emitted by any number of user devices 102, such as user devices 102 that are or include speakers (e.g., a stereo system, a home theater, a headphone, an in-ear monitor, or any other conventional audio output device).

In one example of an embodiment of the operating environment 100, the user can visualize as a video or image output movement on a road with the flow of traffic, then subsequently input a U-turn to go in the opposite direction, thus updating the position requested by the user and the subsequent video output generated by location viewing system 120. The presentation or stitching software executed by the location viewing system 120 can generate images and/or videos for display by a user device 102 as determined by the sensor determination controller 123. In practice, with reference to the U-turn example described above, the location viewing system 120 may communicate with sensor sources 130 located along a road or street that cover a vehicle traveling in both directions (e.g., sensor sources 130 that are positioned such that motion of the vehicle can be captured regardless of the direction in which the vehicle is traveling), in such a way to enable the user a realistic and real-time experience of making a U-turn, and then presenting a video output of a traveler moving in the opposite direction.

The system also enables a user the ability to virtually travel to any captured environment. In one embodiment, a user may enter a mall like a shopping mall, and walk in any direction they want, go into a store or shop, and move around in any direction, look at the items in the shop, visualize the people moving around, interact with any person in the shop, converse with staff or any person (if the staff or persons are connected with the system), purchase and order any item and pay for it, order said item for delivery, and/or the like.

The virtual render generator 121 can obtain information indicating a direction in which a user wishes to travel (e.g., North, South, East, West, or any combination thereof; angle at a location; vertical orientation at a location; horizontal orientation at a location; etc.) and/or a speed at which the user wishes to travel (e.g., from the request, from user inputs as the user navigates the space, etc.). Because the positions or locations of each sensor source 130 is known to the location viewing system 120 and stored in the sensor data store 125, the virtual render generator 121 can determine the location of a sensor source 130 that is capturing a scene to which the user should be moving from a previous position. For example, the location of a sensor source 130 that is capturing a scene to which the user should be moving may be determined by the virtual render generator 121 by dividing the speed of the user's travel (e.g., in distance per second) by the frame rate (e.g., in frames per second) at which the frames or images are being displayed by the user device 102 to determine a distance, and identifying a location that is the determined distance from the sensor source 130 that captured the previous frame or image in a direction of the user's travel. The virtual render generator 121 can then retrieve a frame or image captured by the sensor source 130 at the identified location at a time that is an inverse of the frame rate after the time instant corresponding to the time at which the previous frame or image displayed by the user device 102 was captured by a sensor source 130. The virtual render generator 121 can repeat these operations one or more times until the final frame or image that the virtual render generator 121 causes the user device 102 to display corresponds to a final location to which the user wishes to travel.

In some embodiments, the sensor sources 130 can be placed both vertically and horizontally at different positions in a space. The sensor sources 130 can be positioned to cover the view of the complete volume of a place (e.g., a room) or within a defined perimeter in a space. For example, the walls of a place can be covered by horizontal and/or vertical series of cameras to form a grid-like pattern of cameras. The grid-like pattern of cameras can enable the capture of images that cover a 360 degree view. The location viewing system 120 can stitch together one or more images captured by the cameras for display to a user to enable the user to virtually move around freely in a seamless manner. Thus, when such a system is placed in a place like an aquarium, the complete visualization of every possible movement of organisms in the aquarium can be captured and presented to a user at a remote location, as if the user is present within the aquarium waters, interacting with the marine animals in real-time.

Additionally, the operating environment 100 can be configured with a variety of sensor sources 130, including cameras, microphones, global positioning system (GPS) devices, range finding devices, 3D mapping devices, geographic information system (GIS) devices, thermometers, barometers, hygrometers, and other ambient sensors in order to further provide or refine three-dimensional data, directionality data, or other inputs, like atmospheric conditions. In some embodiments, microphones can be placed at various positions throughout a scene. In some embodiments, the location viewing system 120 can perform further signal processing on various input signal data in order to approximate conditions at any point along a scene. In some embodiments, the location viewing system 120 performs 3D audio signal processing on the input signal data, where the resulting output approximates the range of sounds surrounding a user at any particular point or time within a scene.

Position data can also be automated independent of user input as well. Automatic navigation by road rules can be incorporated by implementing arbitrary road rules into the location viewing system 120.

In some embodiments, the location viewing system 120 can enable a surround audiovisual theater that can provide the experience of being in a space like Times Square, an aquarium, a concert hall, or an entertainment park, based on presentations from multiple projectors connected and corresponding to the series of camera systems in a space. This type of surround audio, visual, and haptic system can provide a realistic 3D immersive experience to a user.

User Input

In some embodiments, the location viewing system 120 is configured in such a way to receive user input data in real-time from user devices 102. In some embodiments, user input data is provided via at least one of a mouse, a touchscreen, a gesture-detecting device (e.g., a camera, a motion sensing device, etc.), and/or the like. In some embodiments, gestural input comprises any gesture by which the user moves his or her hands, eyes, face, head, fingers, legs, feet, or any other part of the body. The location viewing system 120 (e.g., the position parser 124) can be configured to process the gestural input to generate a video output.

Furthermore, the operating environment 100 allows for a user to visualize and approximate a view as if the user were inside a car moving on a road. The user can then simulate driving the car by providing additional input, such as a request to move in one direction along the road.

In another use case, a pedestrian walkway can be configured to include one or more sensor sources 130. A user can request via a user device 102 to view the pedestrian walkway virtually and/or to move to different locations on the pedestrian walkway at varying speeds and/or pace and/or in varying directions.

The user devices 102 may use gyroscopic technologies to detect angular motions and/or movements to capture the motion of the user or an object in 360 degrees. Thus, the user may be able to provide the same type of input to the user device 102 regardless of whether the user is attempting to simulate driving a car on a road, walking on a pedestrian path, biking on a biking path, swimming in an underwater space, and/or the like.

Example Block Diagrams for Generating a Video Output

Figure 2:
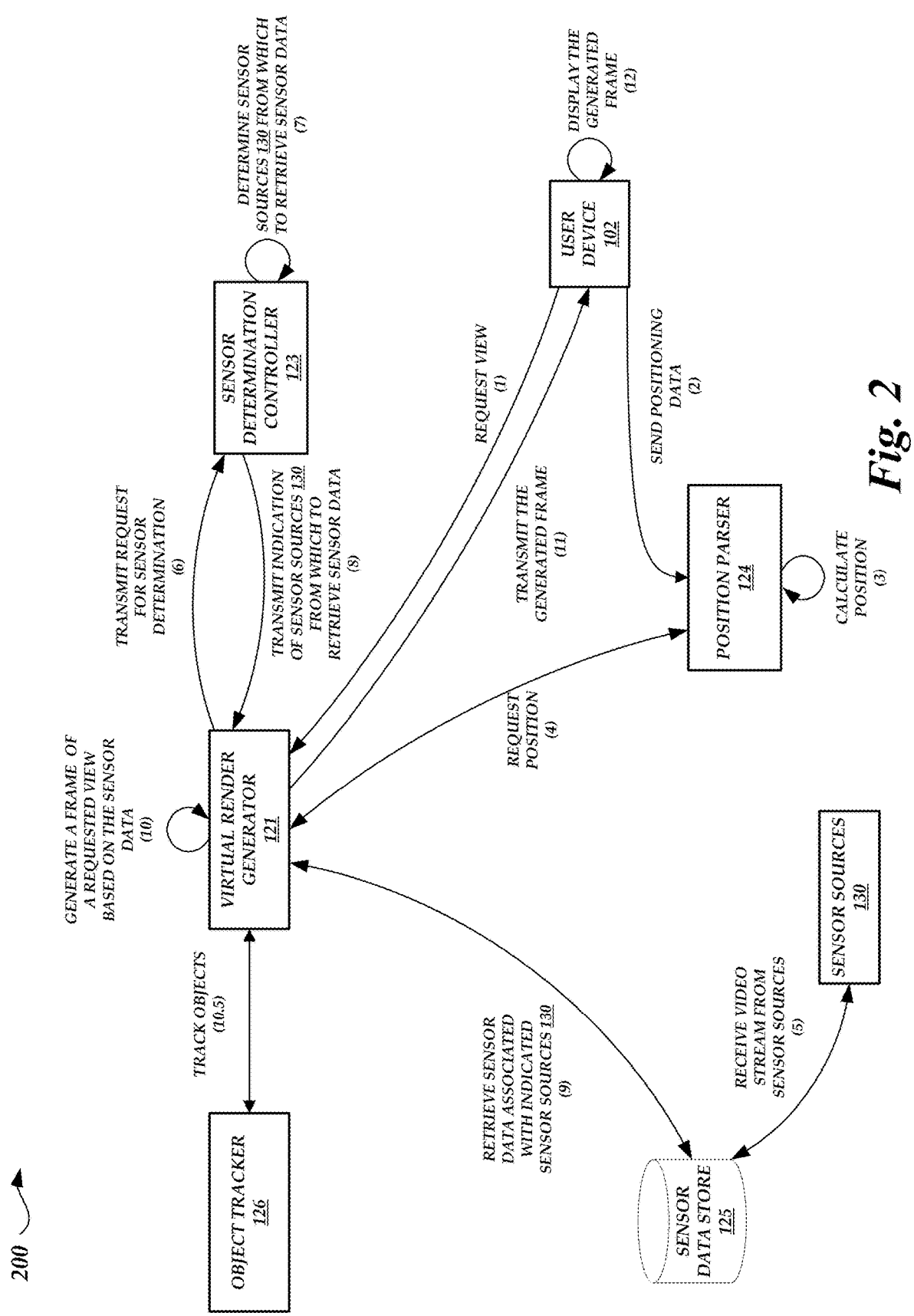
FIG. 2 illustrates an example diagram that visually depicts operations that may be performed by a location viewing system to visualize a remote location.

FIG. 2 is a flow diagram 200 illustrating the operations performed by the components of the operating environment 100 of FIG. 1. As illustrated in FIG. 2, a user device 102 may request a video output from the location viewing system 120 (e.g., virtual render generator 121).

For example, the user device 102 may request a view (e.g., video output) at (1) from the virtual render generator 121. Before, during, and/or after the request by the user device 102, the user device 102 may send positioning data comprising an initial position and optionally directional, velocity, momentum, or other data corresponding to user movement to the position parser 124 at (2). The position parser 124 can use the received data to calculate an initial position at (3). At (4), the virtual render generator 121 requests an indication of the initial position calculated by the position parser 124. For example, the user device 102 may request a view (e.g., video output) of a real place (e.g., a street) starting at a position selected by the user, which is reflected by the request at operation (1). The position selected by the user may be transmitted at (2), processed by position parser 124 at (3) to calculate an initial position, and the resulting calculated position can be provided to the virtual render generator 121 at (4).

At (5), the sensor data store 125 receives sensor data (e.g., a stream of video, individual frames of a video, one or more images, etc.) from one or more sensor sources 130. The sensor data store 125 can store the sensor data (and any associated metadata) from the sensor source(s) 130. By way of example, the sensor sources 130 may be a set of cameras along a street, spaced at particular intervals and at particular elevations, with predetermined fields of view. As described herein, the sensor data may be received and stored at any time, asynchronous of user requests to view a location. The sensor data may be received and stored as the sensor data is captured by the sensor sources 130.

At (6), the virtual render generator 121 transmits a request for a sensor determination to sensor determination controller 123, where the request may include an indication of the initial position calculated by the position parser 124. The sensor determination controller 123 determines which sensor sources 130 from which to retrieve sensor data based on the calculated initial position at (7), and transmits an indication of which sensor sources 130 from which to retrieve sensor data to the virtual render generator 121 at (8).

The virtual render generator 121 can retrieve from the sensor data store 125 the sensor data captured by the sensor sources 130 indicated by the sensor determination controller 123 at (9). The virtual render generator 121 can then generate a frame of a requested view based on the retrieved sensor data at (10). Optionally, at (10.5), the virtual render generator 121 (or the user device 102) can transmit one or more frames or images to the object tracker 126 for use in object tracking. For example, the object tracker 126 can use artificial intelligence or other image processing techniques to identify a selected object in the received frame(s) or image(s) and to attempt to identify the same object in other frame(s) or image(s) captured by other sensor sources 130 other than the sensor source 130 that captured the received frame(s) or image(s), and as described herein. The frame generated at (10), optionally selected in accordance with tracking data generated and provided by the object tracker 126, may be one frame of a video that is output to the user device 102. For example, the virtual render generator 121 can transmit the generated frame to the user device 102 at (11), and the user device 102 can display the generated frame at (12). Operations (9), (10), (10.5), (11), and/or (12) can be repeated one or more times such that the virtual render generator 121 generates and transmits to the user device 102 one or more frames in succession. As a result, the user may see a view of the initial position and/or other positions to which the user would like to move as a video without a noticeable interruption in playback.

Figure 3:
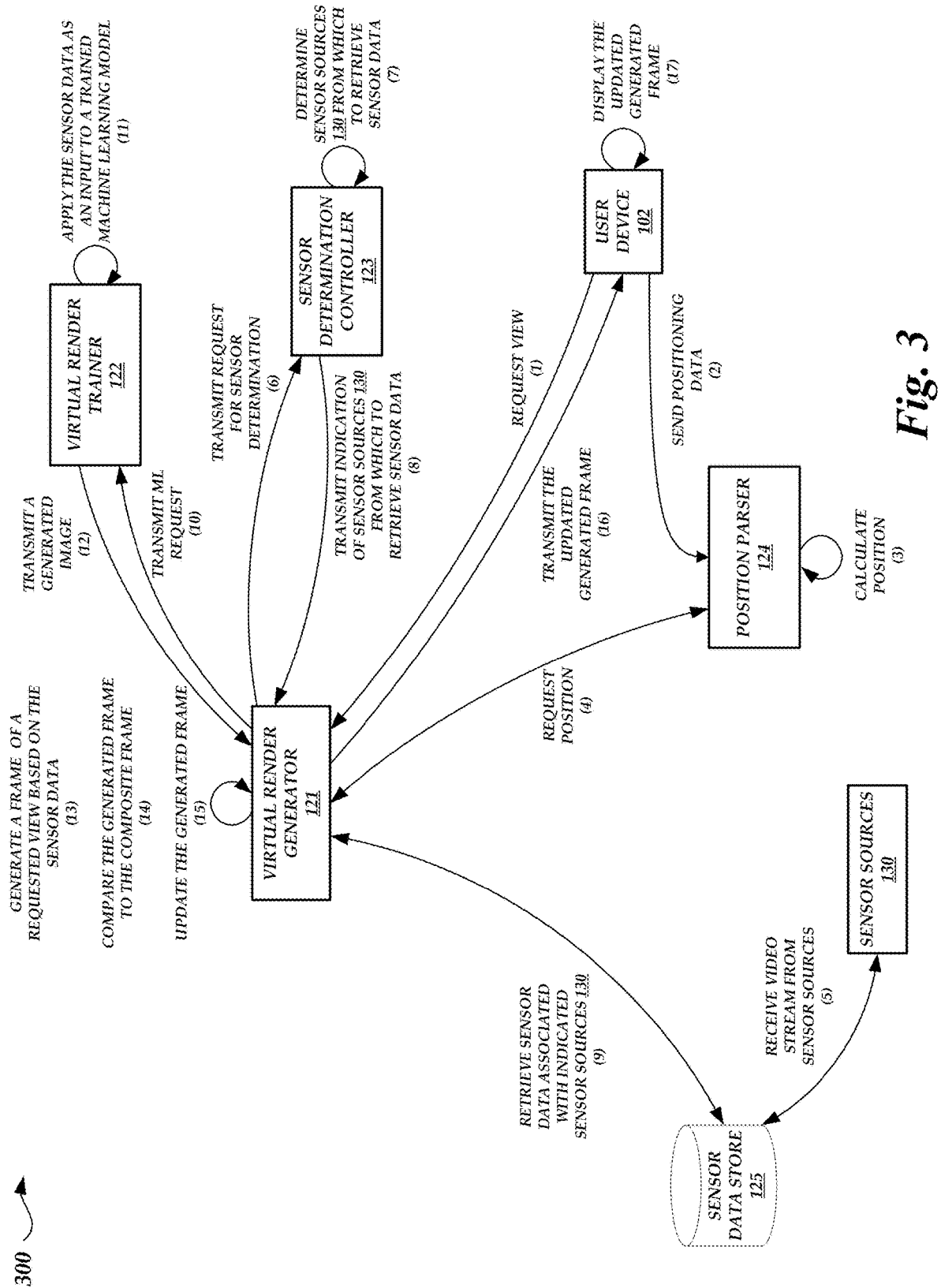
FIG. 3 illustrates an example diagram that visually depicts operations that may be performed by a location viewing system to visualize a remote location.

FIG. 3 is a flow diagram 300 illustrating the operations performed by the components of the operating environment 100 of FIG. 1 with an optional machine learning component. As illustrated in FIG. 3, a user device 102 may request a video output from the location viewing system 120 (e.g., virtual render generator 121).

With respect to FIG. 3, operations (1)-(9) are as described above with respect to the flow diagram 200. At (10), the virtual render generator 121 transmits a machine learning request to the virtual render and object tracking trainer 122. The virtual render and object tracking trainer 122 may have previously trained a machine learning model using training data obtained from the sensor data store 125, where the training data includes one or more training data items. For example, each training data item may include one or more images captured by one or more sensor sources 130 at a particular location and may be labeled with an indication of a particular location to which a user would like to travel and an actual image viewable at a position at the particular location to which the user would like to travel (e.g., where the actual image may represent a composite image that could be formed from the image(s) included in the respective training data item). Thus, the virtual render and object tracking trainer 122 may have trained the machine learning model to output or predict a composite image based on one or more captured images provided as an input to the machine learning model. The machine learning request may therefore include the sensor data retrieved from the sensor data store 125 (e.g., one or more images captured by one or more sensor source(s) 130 indicated by the sensor determination controller 123) so that the sensor data can be applied as an input to the trained machine learning model.

The virtual render and object tracking trainer 122 can apply the sensor data and/or an indication of a particular location to which the user would like to travel as an input to the trained machine learning model at (11), which causes the trained machine learning model to output a generated, or composite frame (e.g., generated image). The virtual render generator 121 can generate a frame of a requested view based on the sensor data at (13). The virtual render generator 121 can then compare the generated frame to the composite frame output by the trained machine learning model at (14). If there is a discrepancy between the generated frame and the composite frame (e.g., one or more pixels of the generated frame have a different value than the corresponding pixels of the composite frame), the virtual render generator 121 can update the generated frame based on the composite frame at (15). For example, the virtual render generator 121 can replace the generated frame with the composite frame in response to a discrepancy. As another example, the virtual render generator 121 can modify some of, but not all of, the pixel values of the generated frame that are different than the composite frame such that the modified or updated generated frame is a blend of the initially generated frame and the composite frame. There may be a discrepancy in the frames due to a temporary obstruction in depicted in the sensor data, such as an unexpected shadow, a temporary obstructing object (e.g., a vehicle, a pedestrian, an animal, etc.), and/or the like.

The virtual render generator 121 can then transmit the updated generated frame to the user device 102 at (16), and the user device 102 can display the updated generated frame at (17). Some or all of the operations of the flow diagram 300 can be repeated one or more times such that the virtual render generator 121 generates and transmits to the user device 102 one or more frames in succession. As a result, the user may see a view of the initial position and/or other positions to which the user would like to move as a video without a noticeable interruption in playback.

Optionally, the virtual render and object tracking trainer 122 can re-train or update the trained machine learning model based on received feedback data, which can include one or more images captured by a sensor source 130 at a position corresponding to an outputted composite frame. For example, the virtual render and object tracking trainer 122 can determine any differences between the actual image captured at the position and the composite frame output by the trained machine learning model, and can re-train or update the trained machine learning model based on these difference(s).

Example Video Output Generation

Figure 4:
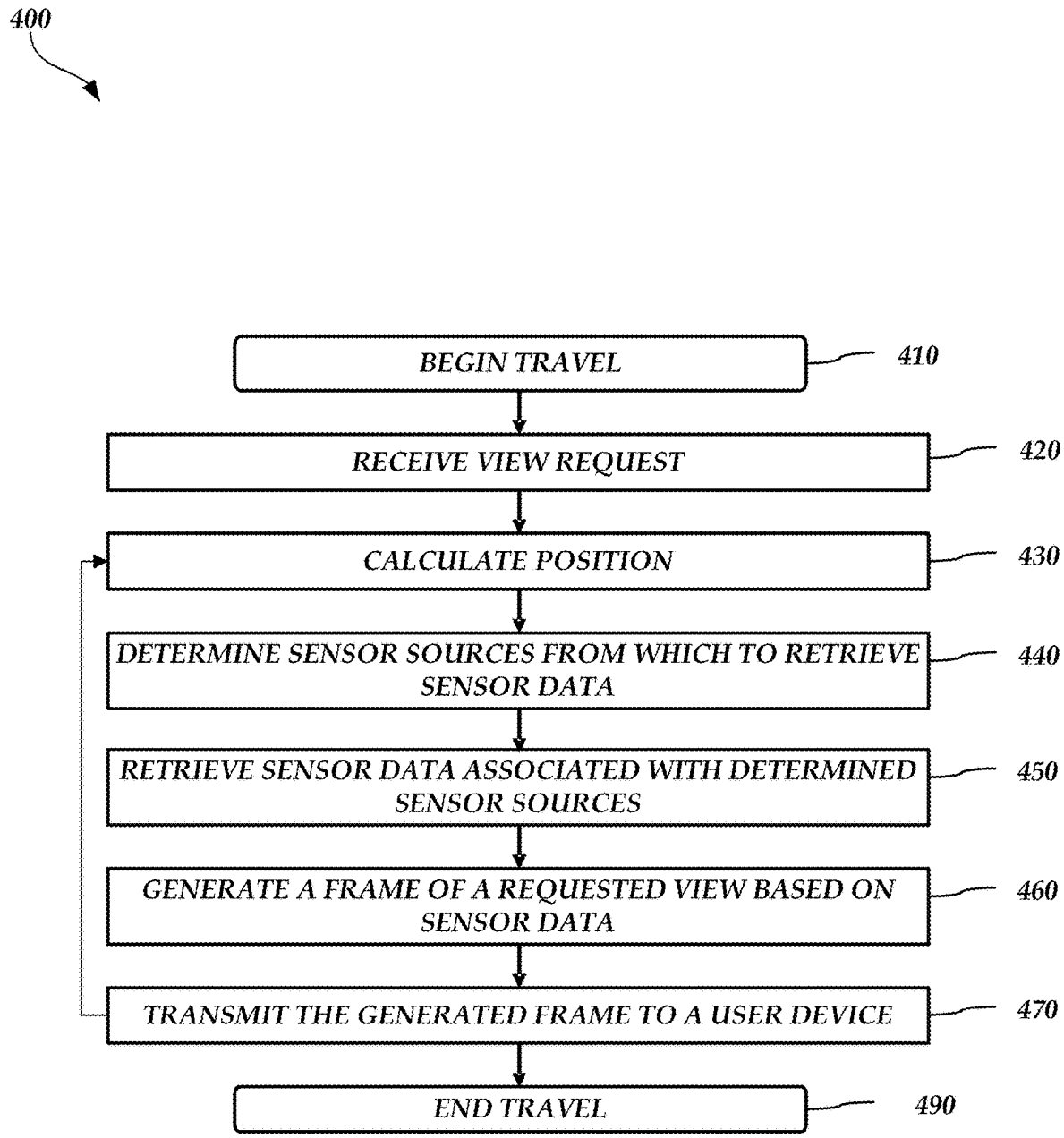
FIG. 4 is a flow diagram illustrating the operations performed by the components of the operating environment of FIG. 1 to visualize a remote location.

FIG. 4 is a flow diagram depicting an example video output generation routine 400 illustratively implemented by a location viewing system, according to one embodiment. For example, the location viewing system that implements the video output generation routine 400 may be the location viewing system 120 of FIG. 1. The generation routine 400 begins at block 410.

At block 420, the location viewing system receives a view request. For example, the view request can be obtained from a user device 102. The view request can include a request to view a particular location.

At block 430, a position is calculated. For example, the position may be an initial position calculated based on the location identified in the view request.

At block 440, a determination is made as to the sensor sources from which sensor data should be retrieved. For example, the determination may be made based on the initial position that is calculated.

At block 450, sensor data is retrieved that is captured by the determined sensor sources.

At block 460, a frame is generated based on the retrieved sensor data. For example, the frame may be formed from stitching together one or more images included in the retrieved sensor data, may be one of the images included in the retrieved sensor data, may be formed from blending pixel values from one image in the sensor data with pixel values from another image in the sensor data, and/or the like.

At block 470, the generated frame is transmitted to a user device. In response, the user device may cause the frame to be displayed for viewing by a user. After the frame is transmitted, the routine restarts at block 430 for the next position until the user decides to end the travel, wherein the routine 400 ends, as shown at block 490.

Figure 5:
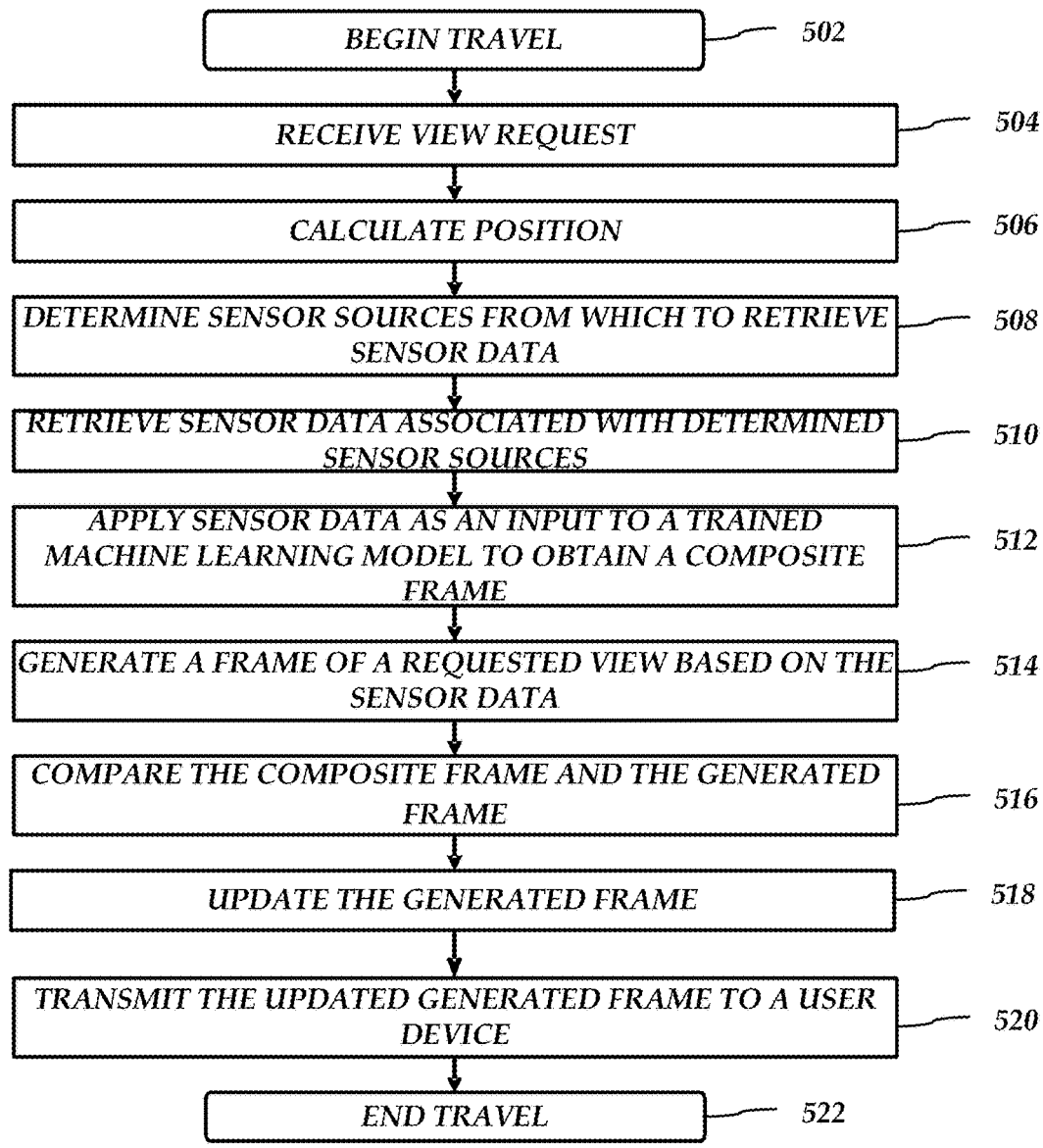
FIG. 5 is a flow diagram illustrating the operations performed by the components of the operating environment of FIG. 1 to visualize a remote location.

FIG. 5 is a flow diagram depicting another example video output generation routine 500 illustratively implemented by a location viewing system, according to one embodiment. For example, the location viewing system that implements the video output generation routine 500 may be the location viewing system 120 of FIG. 1. The generation routine 500 begins at block 502.

At block 504, the location viewing system receives a view request. For example, the view request can be obtained from a user device 102. The view request can include a request to view a particular location.

At block 506, a position is calculated. For example, the position may be an initial position calculated based on the location identified in the view request.

At block 508, a determination is made as to the sensor sources from which sensor data should be retrieved. For example, the determination may be made based on the initial position that is calculated.

At block 510, sensor data is retrieved that is captured by the determined sensor sources.

At block 512, the sensor data is applied as an input to a trained machine learning model to obtain a composite frame. Optionally, a position to which a user would like to move is also provided as an input to the trained machine learning model. For example, the machine learning model may have been previously trained to output a frame depicting a view from a position given one or more images provided as an input to the model.

At block 514, a frame is generated based on the retrieved sensor data. For example, the frame may be formed from stitching together one or more images included in the retrieved sensor data, may be one of the images included in the retrieved sensor data, may be formed from blending pixel values from one image in the sensor data with pixel values from another image in the sensor data, and/or the like.

At block 516, the composite frame is compared to the generated frame. For example, the comparison may include a comparison of a pixel value of the composite frame with a corresponding pixel value in the generated frame.

At block 518, the generated frame is updated based on the comparison. For example, the comparison may indicate a difference between one or more pixels in the composite and generated frames. The generated frame can be updated to include one or more pixel values found in the composite frame, the generated frame can be updated by being replaced with the composite frame, and/or the like.

At block 520, the updated generated frame is transmitted to a user device. In response, the user device may cause the frame to be displayed for viewing by a user. After the updated generated frame is transmitted, the routine 500 ends, as shown at block 522.

Figure 6:
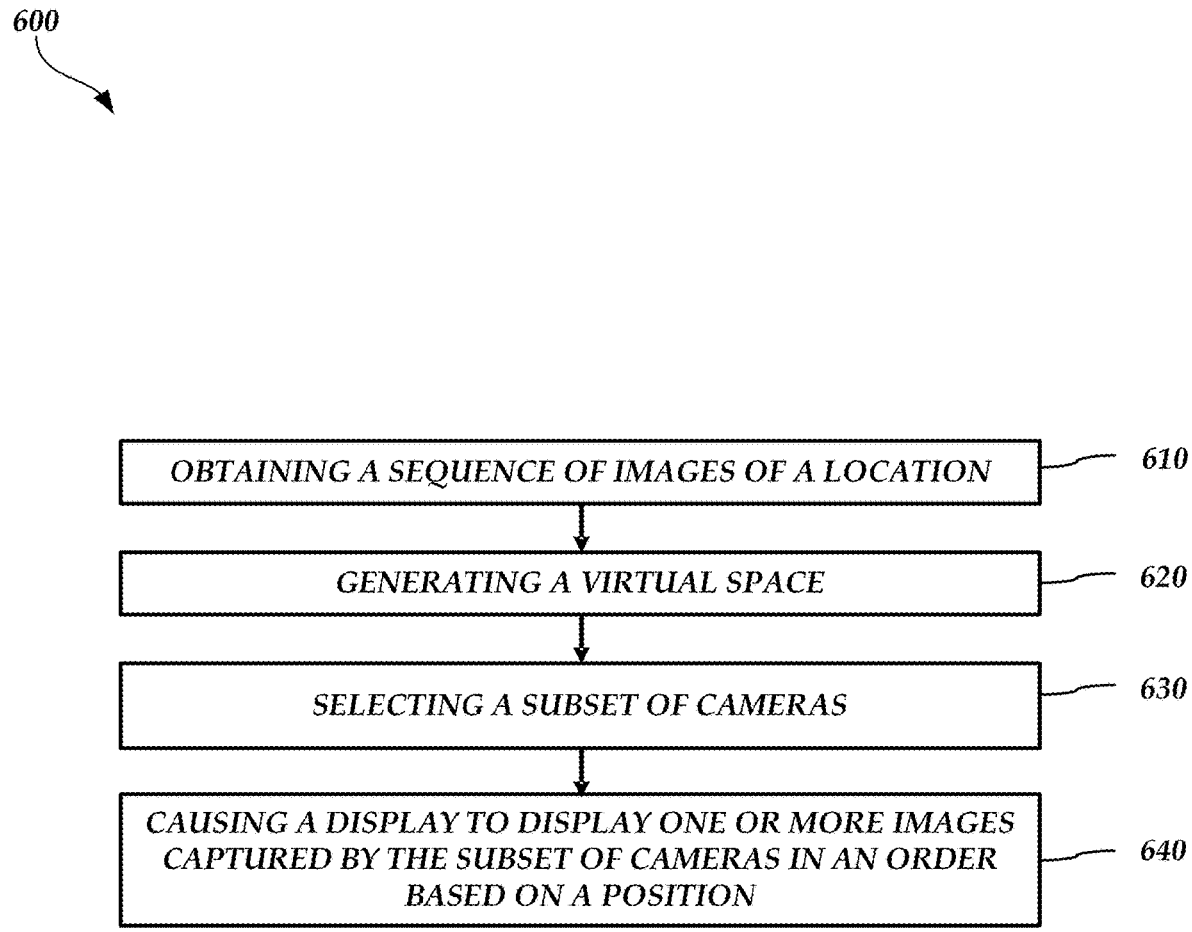
FIG. 6 is a flow diagram illustrating the operations performed by the components of the operating environment of FIG. 1 to visualize a remote location.

FIG. 6 is a flow diagram depicting another example video output generation routine 600 illustratively implemented by a location viewing system, according to one embodiment. For example, the location viewing system that implements the video output generation routine 600 may be the location viewing system 120 of FIG. 1. The generation routine 600 begins at block 610.

At block 610, a sequence of images of a location are obtained. The sequence of images of a location can be generated by one or more video cameras placed at specific distance intervals and/or at predefined positions. Optionally, one or more sensors in addition to a video camera can be placed at the predefined positions. The one or more sensors can include audio and/or atmospheric sensors. Moreover, the predefined positions of the video cameras and the corresponding field of views (which can range up to 360 degrees) may be within a defined space (e.g., a physical location).

At block 620, a virtual space is generated. For example, the virtual space (e.g., the virtual reproduction or reconstruction of a real space) can be generated using the sequence of images of the location. In particular, video cameras may capture a variety of images, and by stitching or otherwise joining the images together, the location viewing system 120 can generate a virtual representation of a location (e.g., a virtual space).

At block 630, a subset of the cameras is selected. For example, the selected cameras may correspond to a specified position, such as a position corresponding to a location that a user would like to view.

At block 640, a display (e.g., of a user device 102) is caused to display one or more images captured by the subset of cameras in an order that is determined based on a position at which the user is viewing the real location.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, virtual reality headsets, virtual reality wearables, and the like. A user device 102 may execute an application (e.g., a browser, a stand-alone application, etc.) that allows a user to view a virtual reproduction or reconstruction of a real space.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Pixel Averaging System

As described herein, a real space may be bounded by a system of cameras and/or sensors as described herein. In some embodiments, a first camera within a series of cameras may therefore capture an image or video stream from a fixed position, of a specific scenery or scene, thereby capturing a first frame. A second camera may be positioned within a set interval distance from the first camera, to capture a substantially similar scene as captured by the first camera, though the second camera's viewpoint differs due to the fact that the second camera's position is offset compared to the first camera, thereby capturing a second frame. Thus, different views of substantially the same scenery may be captured by multiple cameras and/or sensor sources, each camera capturing frames of substantially the same scene. Moreover, each frame captured by each camera may further be represented as a series of pixels according to known color models in the art (e.g., RGB, CMYK). In some embodiments, frames captured by two or more different cameras can have constituent pixel values averaged, to generate a pixel-averaged frame. Therefore, corresponding pixels of the two different frames averaged together will thus produce a new frame which will be the average of the two frames, and the new frame will represent the mid-point of view (mid POV) of the scenery between the two cameras. In effect, two cameras within an embodiment of the present system observing a single object or scene may generate a set of pixel-averaged frames, in order to approximate the view of a third camera located in the middle of the two cameras. In some embodiments, the approximated camera may be located at any arbitrary position between the first and second camera positions, based on the particular weight assigned when averaging pixels.

Figure 16A:
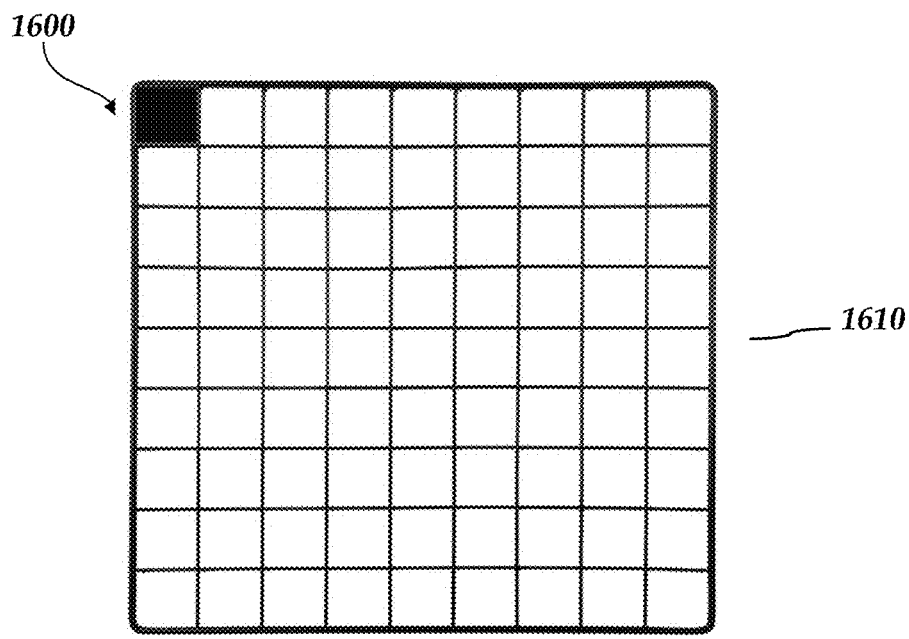
FIG. 16A depicts a frame with pixels.
Figure 16B:
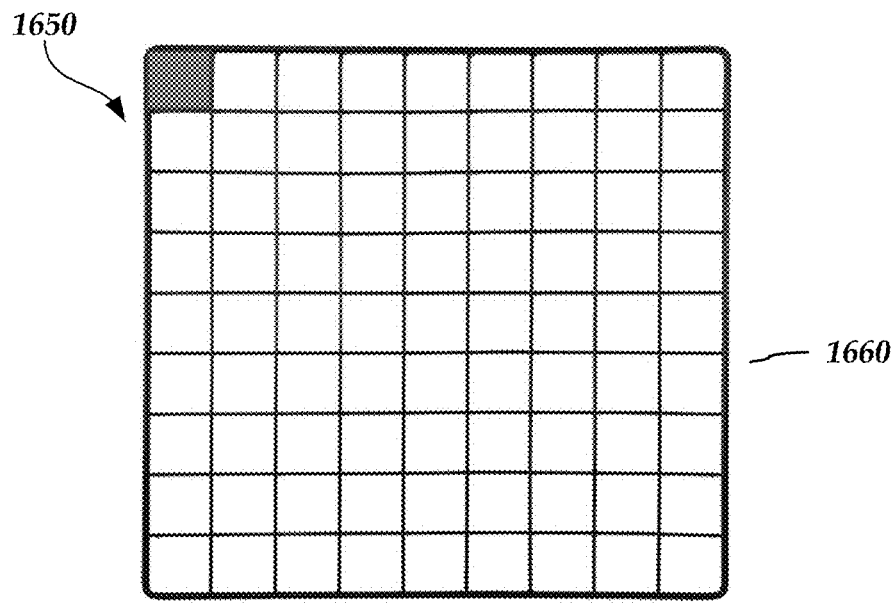
FIG. 16B depicts a frame with pixels.
Figure 16C:
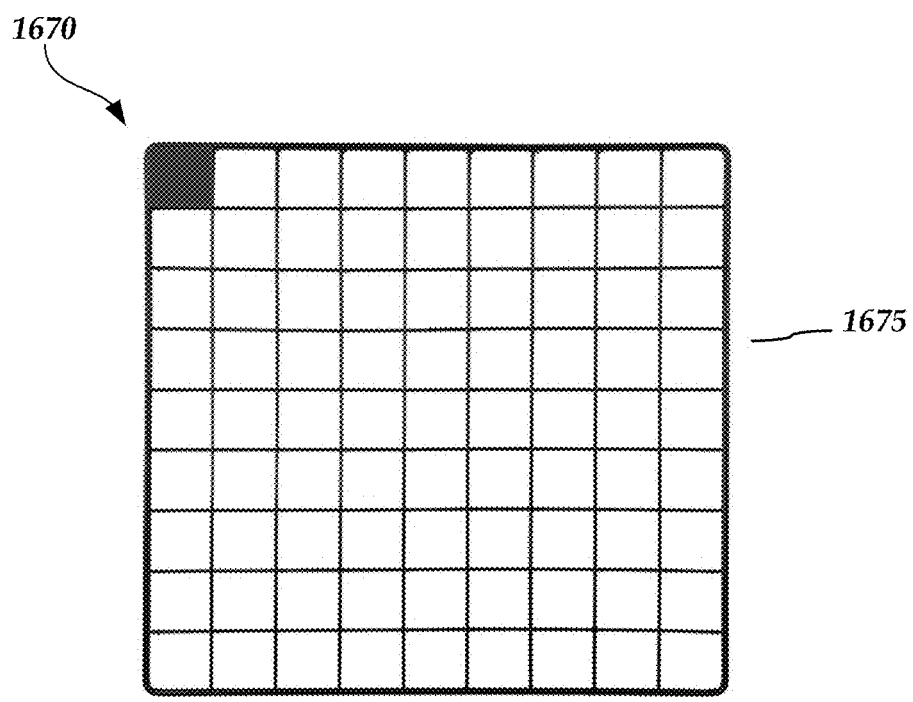
FIG. 16C depicts a pixel-averaged frame with pixels.

FIGS. 16A-16C represent various captured and pixel-averaged frames. Therefore, for conventional 2-dimensional image capture, every pixel within a captured frame may be represented by a particular (x, y) coordinate on the frame. In FIG. 16A, 1610 represents a first frame captured by a first sensor source, with reference pixel 1600 shaded in. FIG. 16B depicts a second frame captured by a second sensor source, which possesses at analogous pixel coordinates as frame 1610, a shaded in pixel 1650. FIG. 16C depicts a pixel-averaged frame 1675, wherein the pixel 1670 is averaged compared to pixel 1600 and pixel 1650. Therefore, for frames captured by two or more cameras, an average frame can be generated according to an embodiment of the present system. Therefore, representing an arbitrary pixel as an RGB value, for example, of (100,100,100), and a corresponding pixel on an additional captured frame of (200, 200, 200), each independent RGB channel may be averaged, to create an averaged pixel of (150, 150, 150). For example, the color models of pixels at the same x, y coordinates of a frame, representing 2 or more frames of a scenery on a plane, can be averaged in value to generate a pixel-averaged frame.

Figure 16D:
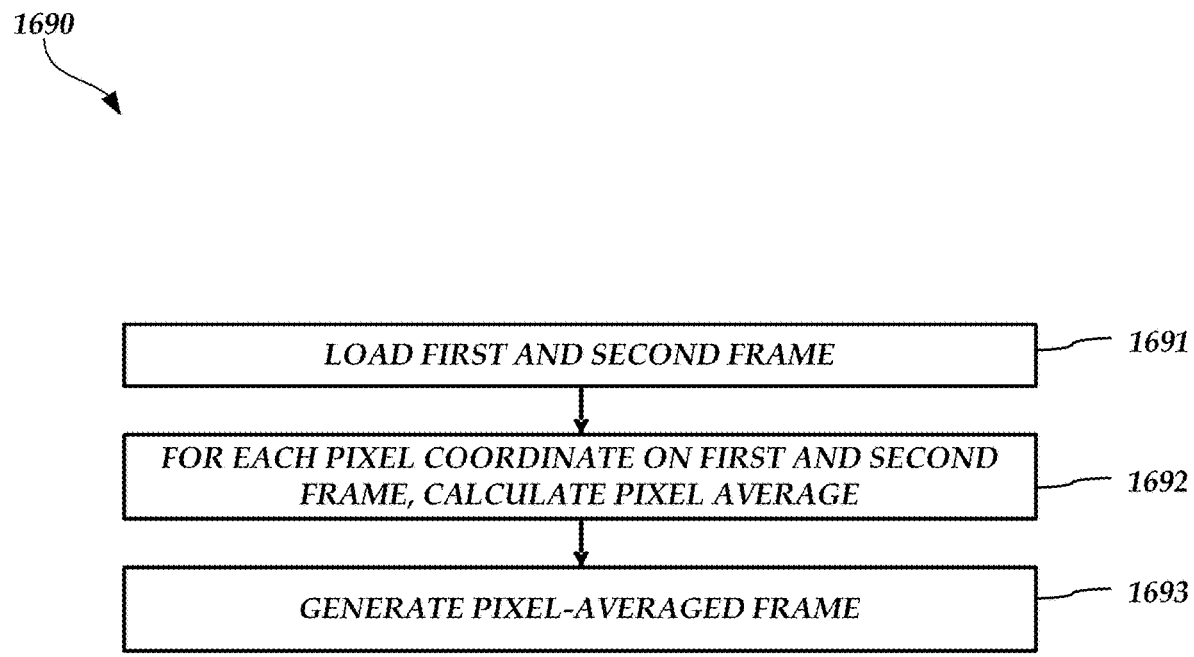
FIG. 16D is a flow diagram illustrating the operations performed when pixel-averaging.

FIG. 16D is a flow diagram depicting an example pixel-average frame generation routine 1690 illustratively implemented by a location viewing system according to one embodiment. For example, the location viewing system that implements the pixel-average frame generation routine may be the location viewing system 120 of FIG. 1. The generation routine 1690 begins at block 1691, where the system loads a first and second frame from memory. In some embodiments, the first and second frame are sourced from two or more cameras, such as two or more cameras that may be oriented to capture the same or similar scene. For example, the boundaries of a scene captured by a camera may form a three-dimensional shape in space (e.g., where the boundaries include one or more edges from a lens of the camera to various points at a geographic location that are depicted within an image captured by the camera), and two or more cameras may be oriented to capture the same or similar scene if at least a portion of the three-dimensional shape representing a scene captured by one camera intersects the three-dimensional shape representing the scene captured by another camera. In other words, two or more cameras may be oriented to capture the same or similar scene if each image captured by the respective cameras includes at least one common object (which may be depicted from different angles in each image). In some embodiments, the first and second frame are sourced from a first and second camera. In some embodiments, the first frame is sourced from a pixel-averaged frame. In some embodiments, the second frame is sourced from a pixel-averaged frame.

At block 1692, a pixel average is calculated. For example, a pixel at a certain X, Y coordinate in the first frame may possess the RGB value of (200,200,200), while a corresponding pixel at the same relative X, Y coordinate in the second frame may possess an RGB value of (0,0,0), meaning a pixel-averaged pixel would possess RGB values of (100, 100,100). As used herein, an X, Y coordinate of a pixel in a first frame may have the same relative X, Y coordinate of a pixel in the second frame if both pixels correspond to the same point or portion of the same object, the same point or portion of the same scene, etc. In some embodiments, the pixel average may assign different weights to the first and second frame pixels, generating a weighted average pixel. Differing weights values assigned to each frame are determined based on relative distance from each camera (or viewpoint) to the desired generated viewpoint. For example, a pixel at a certain X, Y coordinate in the first frame may possess the RGB value of (200,200,200), while a corresponding pixel at the same relative X, Y coordinate in the second frame may possess an RGB value of (50,50,50). Where the system assigns a weight bias of 75% to pixels from frame 1, and a weight bias of 25% to pixels from frame 2, thereby a weighted average pixel would possess the RGB values of (81,81,81)

$$\left(e.g., \frac{(200*0.75)}{2} + \frac{(50*0.25)}{2}, \frac{(200*0.75)}{2} + \frac{(50*0.25)}{2}, \frac{(200*0.75)}{2} + \frac{(50*0.25)}{2}\right).$$

At block 1693, a pixel-averaged frame is generated based on the calculated pixel averaging.

Figure 16E:
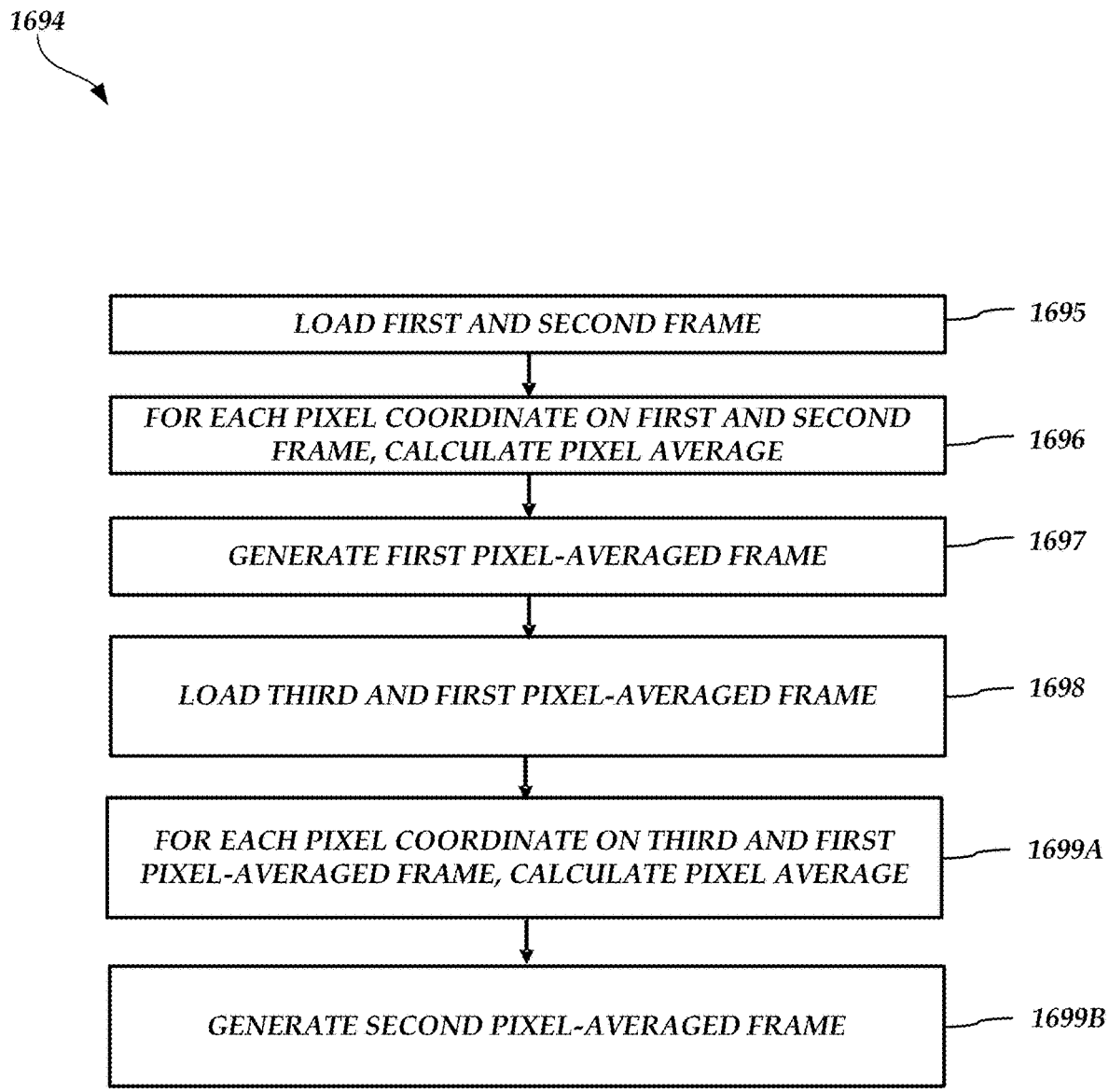
FIG. 16E is a flow diagram illustrating the operations performed when pixel-averaging using at least one prior averaged pixel frame.

FIG. 16E is a flow diagram depicting an example pixel-average frame generation routine 1695 for generating additional pixel-averaged frames illustratively implemented by a location viewing system according to one embodiment. For example, the location viewing system that implements the pixel-average frame generation routine may be the location viewing system 120 of FIG. 1. The generation routine 1695 begins at block 1696. With respect to FIG. 16D, steps 1695-1697 are described above as analogous to steps 1691-1693, respectively, to generate a first pixel-averaged frame.

At block 1698, the first pixel averaged frame and a third frame are loaded from memory. In some embodiments, the third frame is a pixel averaged frame. In some embodiments, the third frame is sourced from memory. In some embodiments, the third frame is sourced from a camera.

At block 1699A, a pixel average is calculated. For example, a pixel at a certain X, Y coordinate in the first frame may possess the RGB value of (200,200,200), while a corresponding pixel at the same relative X, Y coordinate in the second frame may possess an RGB value of (0,0,0), meaning a pixel-average pixel would possess RGB values of (100,100,100). In some embodiments, the pixel average may assign different weights to the first and second frame pixels, based on generating a viewpoint not at the midpoint between the location of the first frame and the second frame, thus generating a series of weighted average pixels. For example, a pixel at a certain X, Y coordinate in the first frame may possess the RGB value of (200,200,200), while a corresponding pixel at the same relative X, Y coordinate in the second frame may possess an RGB value of (50,50,50), and wherein the system is configured to generate a viewpoint at a point 314th the distance between the first and second frame. Where the system assigns a weight bias of 75% to pixels from frame 1, and a weight bias of 25% to pixels from frame 2, thereby a weighted average pixel would possess the RGB values of (81,81,81)

$$\left( e.g., \frac{(200*0.75)}{2} + \frac{(50*0.25)}{2}, \right.$$
$$\left. \frac{(200*0.75)}{2} + \frac{(50*0.25)}{2}, \frac{(200*0.75)}{2} + \frac{(50*0.25)}{2} \right).$$

At block 1699B, a second pixel averaged frame is generated based on the calculated pixel averaging.

Figure 16F:
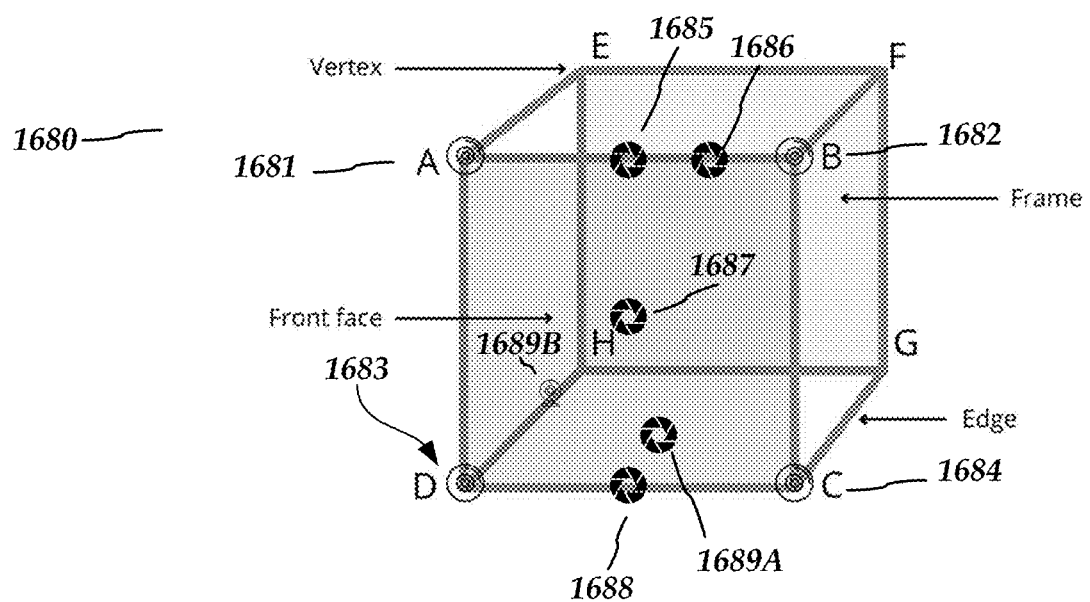
FIG. 16F depicts an example arrangement of cameras, and potential viewpoints which can be generated according to an embodiment of the pixel-averaging system.

FIG. 16F illustrates an example embodiment of the location viewing system 120 described herein, comprising cameras arranged at pre-determined points. Cameras 1681, 1682, 1683, and 1684 are located at points A, B, C, and D, respectively. For camera 1681 at point A, a series of cameras (e.g., two or more) extends in a linear direction towards point E. For camera 1682 at point B, a series of cameras (e.g., two or more) extends in a linear direction towards point F. The same camera arrangement exists for Camera 1684 at Point C, extending to point G, and for Camera 1683 at Point D, extending to point H. Thus, a plurality of cameras is arranged at vectors defined by points A-E, B-F, C-G, and D-H. With respect to the method disclosed in FIG. 16D, the method can generate a pixel-averaged frame to approximate a viewpoint as is from a virtual third camera located at viewpoint 1685 (which is the midpoint between the locations of camera 1681 and 1682). Viewpoint 1686 can be generated by at least two methods of the present disclosure. With respect to FIG. 16E, viewpoint 1686 may be generated using the pixel-averaged frame generated at 1685, averaged against a frame captured from camera 1682 at point B. Alternatively, viewpoint 1686 may be generated using weighted averages. As viewpoint 1686 is located $\frac{3}{4}^{th}$ the distance between camera 1681 and camera 1682, a percent weight bias of 75% is assigned to camera 1682, and a percent weight bias of 25% is assigned to camera 1681. For a viewpoint located at a point $\frac{1}{3}^{rd}$ ("$\frac{1}{3}^{rd}$ point") the distance between any two arbitrary cameras, the percent weight would be 66 and 33 percent, respectively, with the 66 percent weight applied to the camera closest in position to the $\frac{1}{3}^{rd}$ point. Viewpoint 1687, which is the midpoint between viewpoints 1685 and 1688, represents a viewpoint that may be generated using the method described in FIG. 16D or 16E, using frames generated from viewpoints 1685 and 1688. Lastly, viewpoint 1689 may be generated by at least two methods, including using frames derived from cameras located along the C-G and D-H vectors, or alternatively, from cameras 1684 and 1690B, with the resulting pixel-averaged frame having further image processing, image correction (including perspective and distortion correction), and angle-distortion correction applied.

In some embodiments, a first frame and second frame can be averaged, based on the RGB average of the same pixel location in the first frame and the second frame. In some embodiments, a first frame and second frame can be averaged, based on the RGB average of the same relative pixel location in the first frame and the second frame. For example, pixels representing the image of an object within two or more frames can be shifted based on the angle and distance of the viewer in a space. Pixel shift due to camera location can therefore correct for difference in perspective based on camera effective focal length and position.

In some embodiments, the pixel averaging system permits camera arrays to be placed in non-linear arrangements. For example, one or more cameras may follow any regular or irregular pattern of placement, including into sinusoidal patterns, or otherwise offset at regular or irregular intervals in any horizontal plane, any vertical plane, or any combination thereof. For example, a string of 10 cameras may be arranged in a line, or alternatively, arranged in a sine pattern, with 5 cameras placed at each sign crest and trough respectively. As another example, a string of 10 cameras may be arranged in a line, with one or more of the cameras offset from the line in a horizontal, vertical, and/or horizontal and vertical direction. Using an embodiment of the presently described pixel-averaging system, approximate viewpoints between crest-placed cameras and trough-placed cameras may be generated and presented to a user. In one embodiment, where successive cameras are intended to be placed in close proximity, and to avoid obstruction by successive cameras, described herein is a system for alternating or offset camera positions, wherein cameras may be offset by 1, 2, 3, 4, 5, 6, 7, 8, 9, 10, 15, 20, 30, 40, 50, or 100 cameras in a series, or any value in between. Thus, in some embodiments, a camera series may comprise a system wherein every 1, 2, 3, 4, 5, 6, 7, 8, 9, 10, 15, 20, 30, 40, 50, 100 cameras, or any value in between, are offset compared to an initial camera series. Thus, in one embodiment, every $2^{nd}$ camera within a series (e.g. 2, 4, 6 . . . ) is offset compared a first camera series (e.g. 1, 3, 5 . . . ). Cameras may be positioned to avoid obstruction, or as local mounting options may prohibit mounting at certain positions. Therefore, cameras may be mounted to create multiple series of cameras positioned at offset horizontal and vertical positions. The frames from the different series of offset cameras can be shifted or averaged using pixel and frame averaging techniques to produce the view point from the middle point of any two, or greater sets of cameras. The averaged frames representing a mid-point scene can then be presented to the remote viewer.

Artificial Intelligence Trainer

Provided herein are embodiments for training of an artificial intelligence (AI) and machine learning system. Specifically, training of the ML system to perform object tracking of an object residing within a space, the object traveling at a fixed, or variable speed, with fixed, or variable acceleration, and with fixed, or variable changes in direction. In some embodiments, the AI system is capable of automated selection of one or more tracked objects, traveling at variable speeds, directions, accelerations, or orientations.

Figure 17:
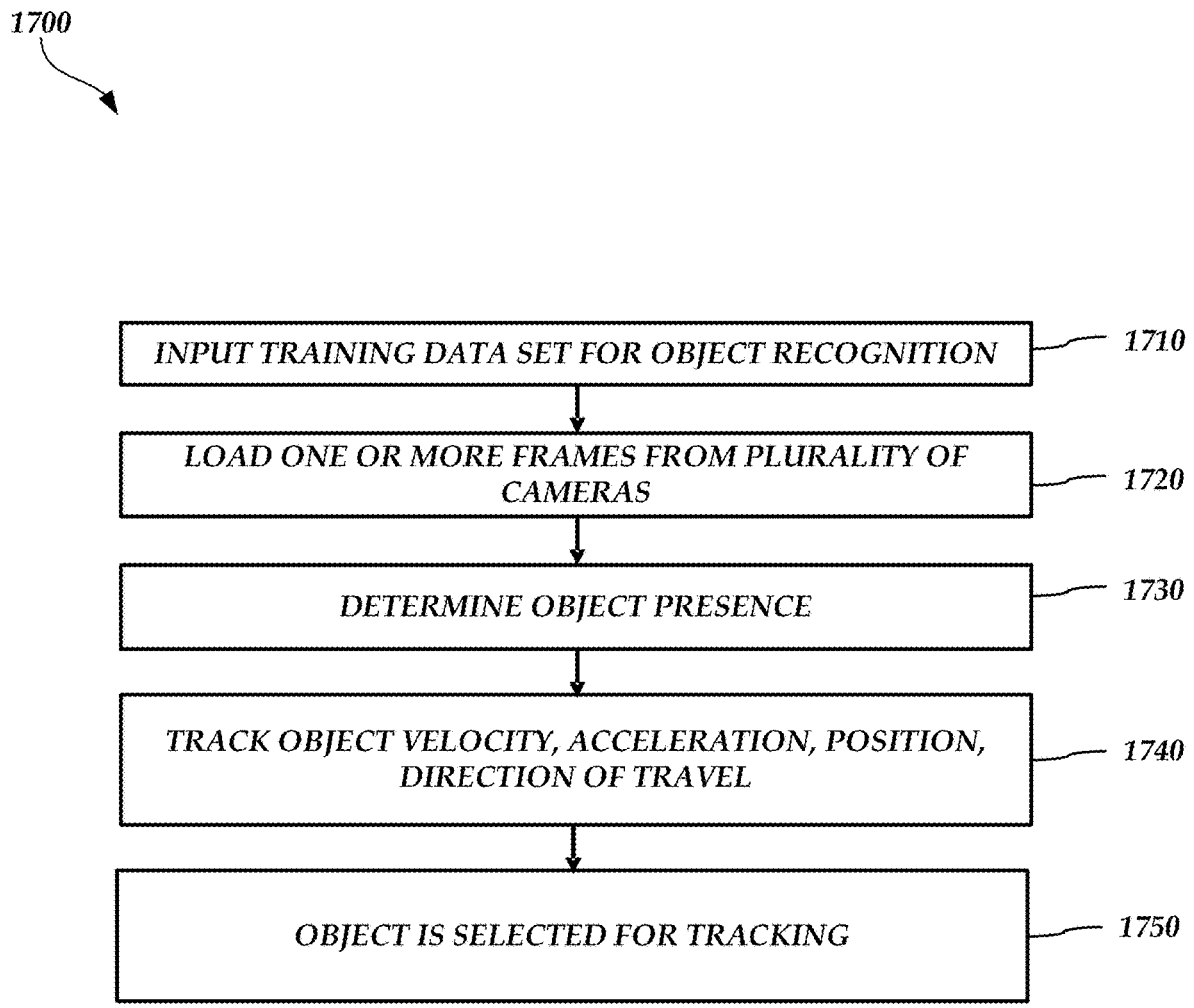
FIG. 17 is a flow diagram illustrating the operations performed in inputting object tracking training data.

FIG. 17 is a flow diagram depicting an example training dataset input workflow for an exemplary AI system of the present embodiment. For example, a system implementing the machine learning workflow 1700 may be the virtual render and object tracking trainer 122 of FIG. 1. The machine learning workflow 1700 begins at block 1710, wherein a training data set is input into an embodiment of the present disclosure. In some embodiments, the training data set are objects commonly found within a predefined space. Where the predefined space is a street within a city, for example, training data in the form of automobiles, clothing, pedestrians, or traffic signals may be provided to be trained. A training data set may take the form of, for example, multiple images of T-Shirts, where the space is expected to encompass a public pedestrian gathering place. In some embodiments, the training data set can comprise expected travel characteristics, including expected velocity, acceleration, position, or direction of travel. A training data set showing traffic flow within a scene for example, can provide initial travel directions and velocities of individual cars to an exemplary machine learning trainer as described herein.

At block 1720, the system loads one or more frames from a plurality of cameras according to an embodiment described herein.

At block 1730, the system then determines and recognizes an object's presence within the retrieved one or more frames. For example, a training dataset of T-shirts as described herein and trained into an exemplary model may allow for an object detection system to recognize all instances of T-Shirts within any given frame. Therefore, the absence or presence of an object may be determined in part by image recognition from a trained machine learning module. In some embodiments, additional optional modules, include an optical character recognition (OCR) may be implemented to recognize and parse particular features within any given frame. For example, a T-Shirt may be tracked based on not only parameters as defined in a machine-learning model, but also tracked based on positive recognition of a text phrase that appears on the T-Shirt.

At block 1740, the system proceeds to track the object's velocity, acceleration, position, or direction of travel. In some embodiments, object tracking can further approximate movement of tracked objects when objects leave a particular field of view of a camera, or are otherwise occluded in a scene. Therefore, an object traveling with a consistent direction and/or velocity can be accurately predicted to re-emerge at a particular location. In some embodiments of the present system, the movement of an object being followed by a user can be captured using a series of cameras instead of a single camera, where the series of cameras have differing fields of view. A tracked object can therefore be continuously tracked by a series of cameras in a real space where suitable sensors are present.

At block 1750, the object is selected for tracking. In some embodiments, the selection is accomplished by a user indicating with an input device. In some embodiments, the selection is accomplished automatically by the system. For example, a scene captured by an exemplary system including a single car, wherein all other tracked objects are fixed or otherwise relatively static, can be automatically selected for tracking according to an embodiment of the invention herein. In some embodiments, automatic selection can involve pre-set criteria, including velocity, color, direction, acceleration, or type of object recognized within the scene.

In some embodiments, one or more elements of the location viewing system 120 may utilize machine learning methods to enhance functionality. For example, selection of cameras corresponding to a user directed pace of travel. In some embodiments, a machine learning system is provided to train a model for selecting cameras at certain positions, when a user is moving at a constant velocity in a constant direction, viewing a scene at a constant or variable angle. In some embodiments, a machine learning system is provided to train a model for selecting cameras at certain positions when the user is increasing or decreasing velocity. In some embodiments, a machine learning system is provided to train a model for selecting cameras at certain positions when the user is increasing or decreasing acceleration. In some embodiments, a machine learning system is provided to train a model for selecting cameras at certain positions when the user selects a pace of travel that has a variable velocity. In some embodiments, a machine learning system is provided to train a model for selecting cameras at certain positions when the user selects a pace of travel that has a variable acceleration. In some embodiments, a machine learning system is provided to train a model for selecting cameras at certain positions when the user selects multiple directions of travel consecutively within a location. In some embodiments, the system is configured to anticipate likely user input from any user input device. Once trained, the system described herein can apply as an input a direction, angle, speed, and/or the like in which the user would like to move, and the trained model may output an indication of an image captured by a particular camera to cause the user device 102 to display in response. The system described herein can then cause the user device 102 to display an image captured by the particular camera.

Emoji Placement

In some embodiments, user generated icons, avatars, or emoji may be placed within a representation of the real space, such that a user may view and optionally, interact with said icon, avatar, or emoji. In some embodiments, icons, avatars, or emoji may be implemented to track specific objects identified by the system, including cars, retail items, and users. In some embodiments, a system of the present disclosure may be configured to display emoji characters in representations of the real space. Where multiple users are accessing a space, and intend to visualize other users within the space, the system may assign an icon or user avatar to represent each individual user. In some embodiments, the icons may allow for users to easily access and view user information, or metadata pertaining to specific scenes. In some embodiments, user movements and additional inputs may be represented by the user icons, avatars, or emoji. For example, a user that inputs a desired change in position or orientation (e.g. moving from left to right) to view a scene from an alternate perspective, may have an icon representing them within the virtual space move in a corresponding manner (e.g. moving from right to left). A user icon, avatar, or emoji, may also be configured to express user output, including gesture, voice, head tilt, body orientation, body position, body shape, and the like. Thus, a user being tracked using any input device, may be represented to other users within a virtual space A remote user using an embodiment of the present disclosure may be represented by an icon, avatar, or emoji within any space wherein the present system is installed. Embodiment of the system allow for meetings of multiple users, and in some embodiments, converse and travel a space together.

In some embodiments, the system may be further configured to provide haptic feedback. For example, a user wearing a vest with moveable haptic elements may perceive "pushes" or other physical forces, when interacting with select elements within a virtual space. In some embodiments, the system may be further configured to animate contextual movements. For example, a user moving from point A to point B may input a request to the system to travel to point B, wherein the system moves an icon, avatar, or emoji representing the user to point B—depending on the context and pre-programmed system rules, the icon can be observed by other users as walking, jogging, running, swimming, kayaking, or any other ambulatory motion, to move from Point A and arrive at Point B. As can be appreciated, the system described in the present disclosure may be implemented in a variety of settings, including amusement parks, amusement rides, walking, jogging, biking, or to tour hazardous or industrial locations.

EXAMPLES

Figure 7:
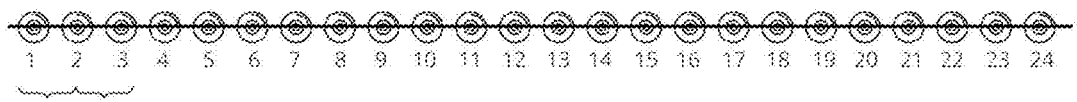
FIG. 7 is schematic illustration of an embodiment of the system presented herein.

FIG. 7. illustrates an example embodiment of the location viewing system 120 described herein. For example, the distance between the cameras depicted in FIG. 7 may correspond to the speed of an object traveling within the real space. If the speed of the object in the real space is 60 miles per hour, the object may travel 26.8 meters in one second. If the frame rate at which the cameras captured images is 24 FPS, then 24 cameras may be placed along a 26.8 meter stretch in the real space. Thus, at 60 miles per hour speed, the distance between cameras can be 1.12 meters (112 centimeters), and the time taken between images captured by consecutive cameras can be 41.7 milliseconds. When an image is captured by each of the successive cameras in the series of cameras at a time interval of about 40 milliseconds (e.g., 41.7 milliseconds) and presented at 24 FPS, the sequence of consecutive frames may produce a seamless video (e.g., a video that can playback without any user-noticeable interruption or skipping of frames) of length one second.

Computer System

Figure 8:
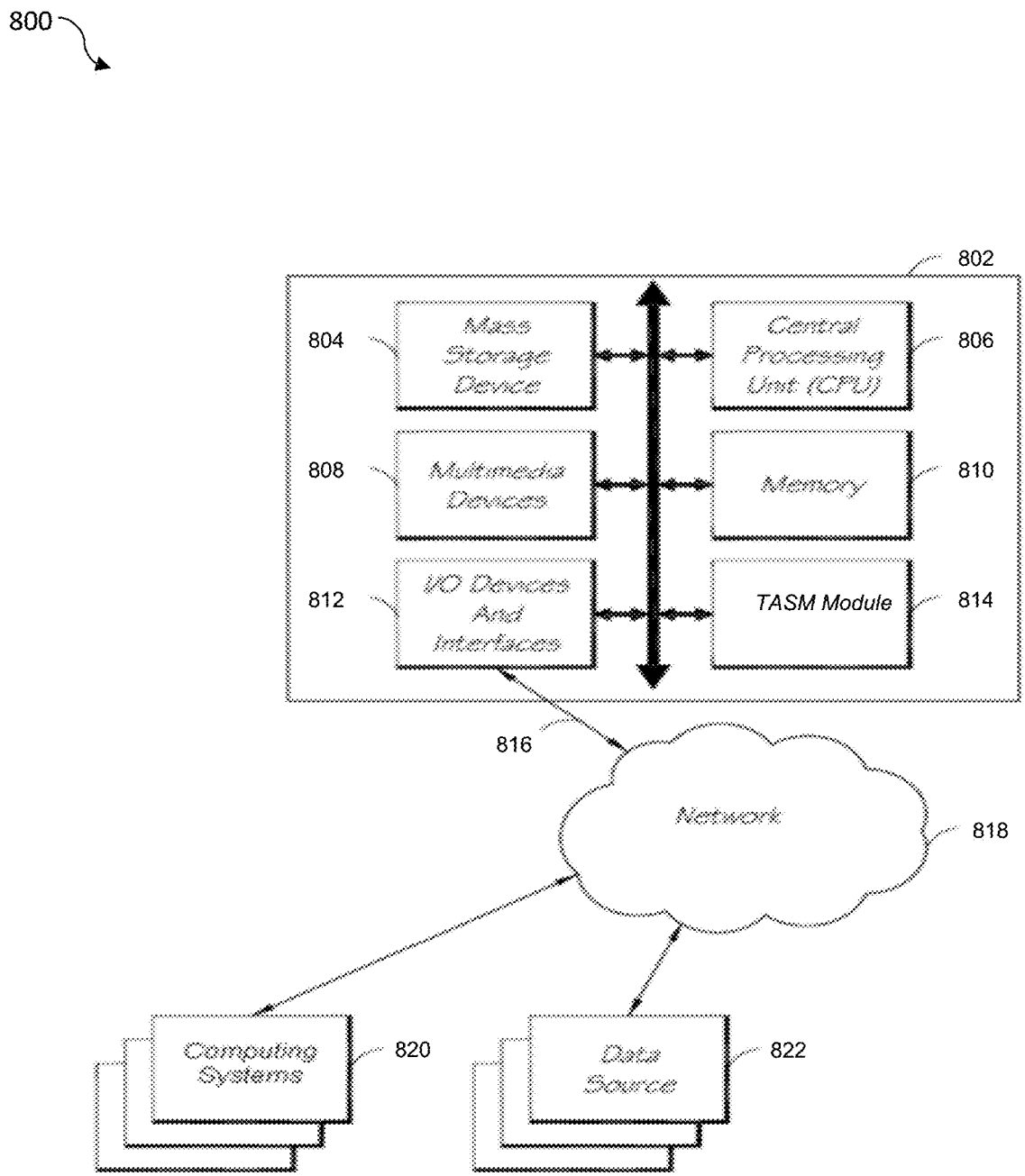
FIG. 8 is a block diagram depicting an embodiment(s) of a computer hardware system configured to run software for implementing one or more embodiments of systems, devices, and methods for visualizing remote locations.

In some embodiments, the systems, processes, and methods described herein are implemented using a computing system 800, such as the one illustrated in FIG. 8. The example computer system 802 is in communication with one or more computing systems 820 and/or one or more data sources 822 via one or more networks 818. While FIG. 8 illustrates an embodiment of a computing system 802, it is recognized that the functionality provided for in the components and modules of computer system 802 can be combined into fewer components and modules, or further separated into additional components and modules.

The computer system 802 can comprise a TASM module 814 that carries out the functions, methods, acts, and/or processes described herein, such as the functionality described herein as being performed by the location viewing system 120. The TASM module 814 is executed on the computer system 802 by a central processing unit 806 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware include connected logic units such as gates and flip-flops, and/or can include programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

Computing System Components

The computer system 802 includes one or more processing units (CPU) 806, which can comprise a microprocessor. The computer system 802 further includes a physical memory 810, such as random access memory (RAM) for temporary storage of information, a read only memory (ROM) for permanent storage of information, and a mass storage device 804, such as a backing store, hard drive, rotating magnetic disks, solid state disks (SSD), flash memory, phase-change memory (PCM), 8D XPoint memory, diskette, or optical media storage device. Alternatively, the mass storage device can be implemented in an array of servers. Typically, the components of the computer system 802 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 812, such as a keyboard, mouse, touch pad, and printer. The I/O devices and interfaces 812 can include one or more display devices, such as a monitor, that allows the visual presentation of data to a user. More particularly, a display device provides for the presentation of GUIs as application software data, and multi-media presentations, for example. The I/O devices and interfaces 812 can also provide a communications interface to various external devices. The computer system 802 can comprise one or more multi-media devices 808, such as speakers, video cards, graphics accelerators, and microphones, for example.

Computing System Device/Operating System

The computer system 802 can run on a variety of computing devices, such as a server, a Windows server, a Structure Query Language server, a Unix Server, a personal computer, a laptop computer, and so forth. In other embodiments, the computer system 802 can run on a cluster computer system, a mainframe computer system and/or other computing system suitable for controlling and/or communicating with large databases, performing high volume transaction processing, and generating reports from large databases. The computing system 802 is generally controlled and coordinated by an operating system software, such as z/OS, Windows, Linux, UNIX, BSD, PHP, SunOS, Solaris, MacOS, ICloud services or other compatible operating systems, including proprietary operating systems.

Operating systems control and schedule computer processes for execution, perform memory management, provide file system, networking, and I/O services, and provide a user interface, such as a graphical user interface (GUI), among other things.

Network

The computer system 802 illustrated in FIG. 8 is coupled to a network 818, such as a LAN, WAN, or the Internet via a communication link 816 (wired, wireless, or a combination thereof). Network 818 communicates with various computing devices and/or other electronic devices. Network 818 is communicating with one or more computing systems 820 and one or more data sources 222. The TASM module 814 can access or can be accessed by computing systems 820 and/or data sources 822 through a web-enabled user access point. Connections can be a direct physical connection, a virtual connection, and other connection type. The web-enabled user access point can comprise a browser module that uses text, graphics, audio, video, and other media to present data and to allow interaction with data via the network 818.

The output module can be implemented as a combination of an all-points addressable display such as a cathode ray tube (CRT), a liquid crystal display (LCD), a plasma display, or other types and/or combinations of displays. The output module can be implemented to communicate with input devices 812 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 802 can include one or more internal and/or external data sources (for example, data sources 822). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 802 can also access one or more databases 822. The databases 822 can be stored in a database or data repository. The computer system 802 can access the one or more databases 822 through a network 818 or can directly access the database or data repository through I/O devices and interfaces 812. The data repository storing the one or more databases 822 can reside within the computer system 802.

Example Embodiments

Figure 9:
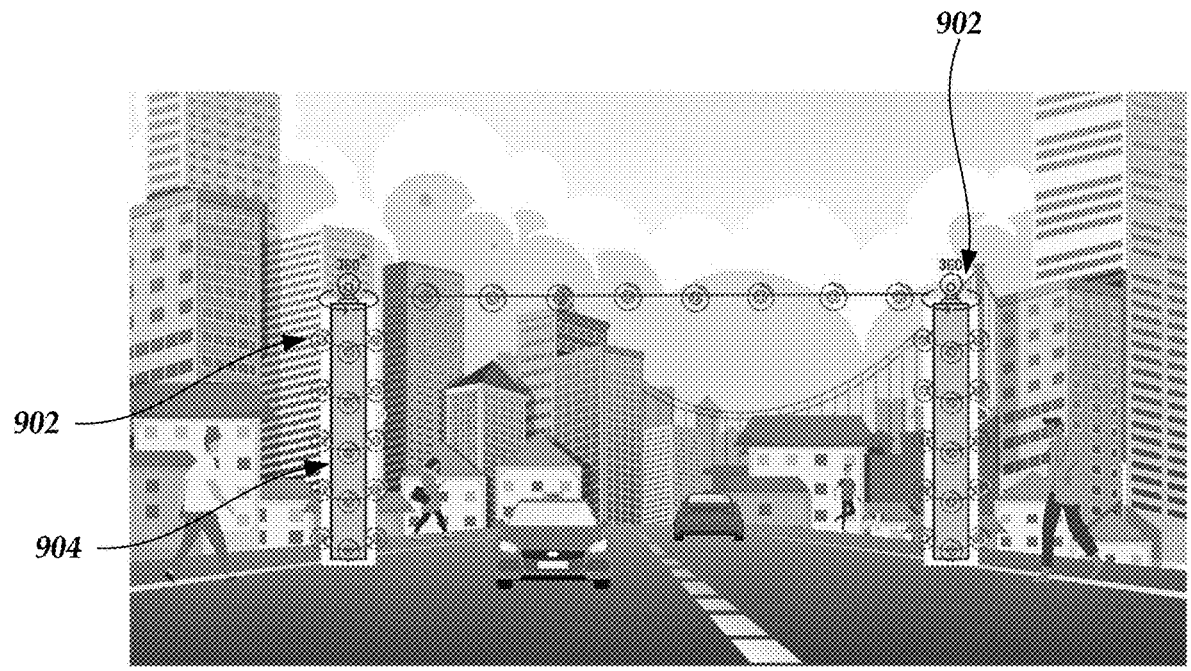
FIGS. 9-13 are example illustrations of an embodiment of the system presented herein.

FIGS. 9-13 and 18 illustrate some embodiments of the present disclosure. For example, FIG. 9 illustrates a system of the present disclosure implemented on a city street. In particular, a pole or other vertically-positioned structure 904 comprises a plurality of cameras 902. Each camera 902 may include one or more lenses placed at different angles and/or directions in a camera series to enable the capturing of up to 360 degree angles of a space. In some embodiments, the cameras 902 can be positioned in a straight line (e.g., a vector), or a subset of cameras 902 can be positioned in a straight line (e.g., a vector). The cameras 902 can be positioned in different horizontal and/or vertical planes. In some embodiments, the cameras 902 can be positioned on a pole, along a wire, on a wall, or any suitable planar surface. In some embodiments, the cameras 902 can be positioned on any fixed location. In some embodiments, the cameras 902 can be immobile. In some embodiments, the cameras 902 can be positioned on one or more moving objects, including on a train, car, person, trolley, shopping cart, or drone. A series of similar cameras, microphones, and/or other sensors can also be placed on the pole 904 and/or on a string or wire that traverses a street and that is supported by at least one pole 904.

Figure 10:
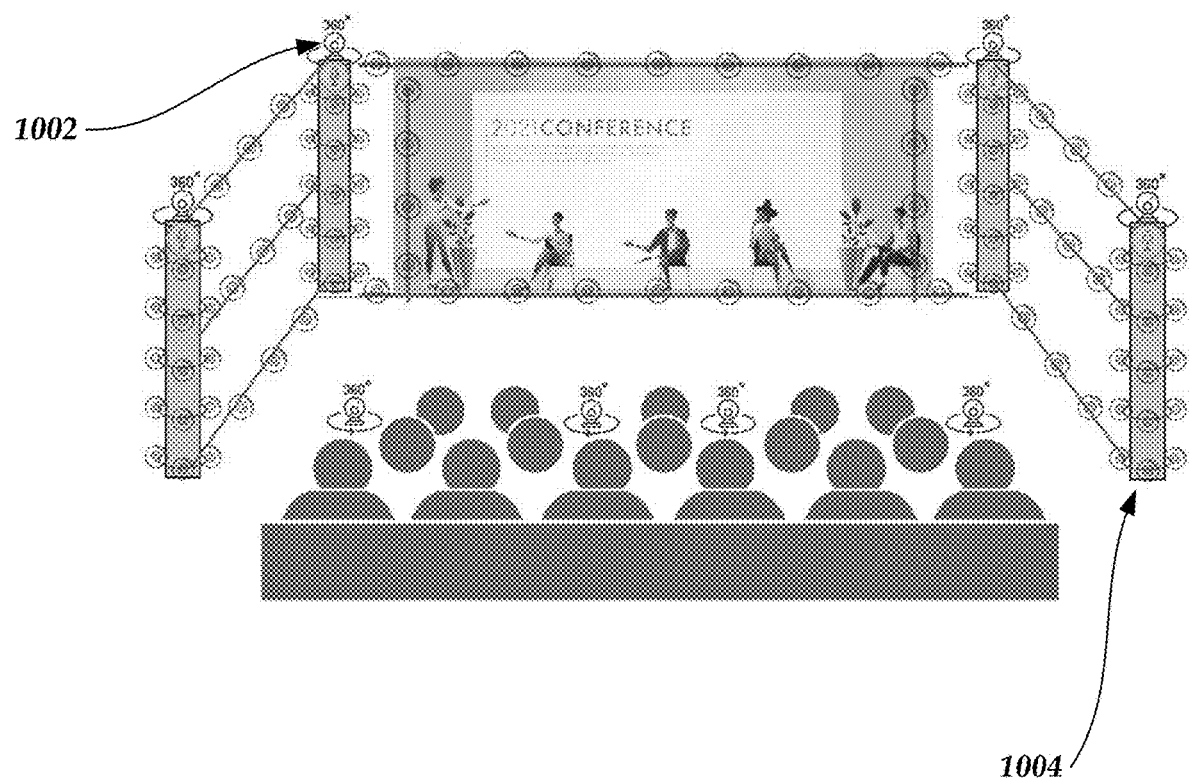

FIG. 10 illustrates a system of the present disclosure implemented in a conference setting. For example, a series of cameras 1002 are installed in a conference hall to cover the walls, the stage, and/or other portions of the hall. The cameras 1002 may be installed on one or more poles or other vertically-positioned structures 1004. Alternatively or in addition, the series of cameras 1002 can also be installed on or around one or more seats in the conference hall in such a way that the cameras 1002 can capture 360 degree images. The cameras 1002 can be positioned in different horizontal and/or vertical planes. A series of similar cameras, microphones, and/or other sensors can also be placed on the pole 1004 and/or on a string or wire that traverses a stage and that is supported by at least one pole 1004.

Figure 11:
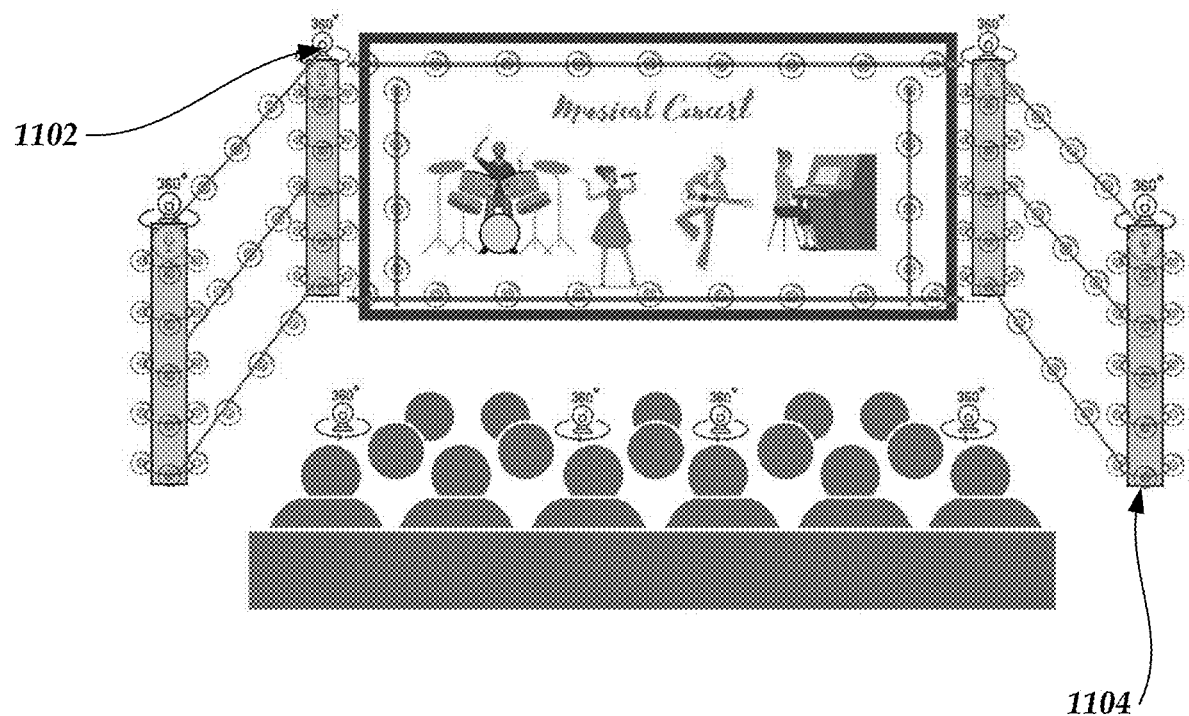

In comparison, FIG. 11 illustrates a system of the present disclosure implemented in a concert or performance venue. For example, a series of cameras 1102 are installed in a performance venue to cover the walls, the stage, and/or other portions of the venue. The cameras 1102 may be installed on one or more poles or other vertically-positioned structures 1104. Alternatively or in addition, the series of cameras 1102 can also be installed on or around one or more seats or the performance stage, in the conference hall in such a way that the cameras 1102 can capture 360 degree images. The cameras 1102 can be positioned in different horizontal and/or vertical planes. A series of similar cameras, microphones, and/or other sensors can also be placed on the pole 1104 and/or on a string or wire that traverses a stage and that is supported by at least one pole 1104.

Figure 12:
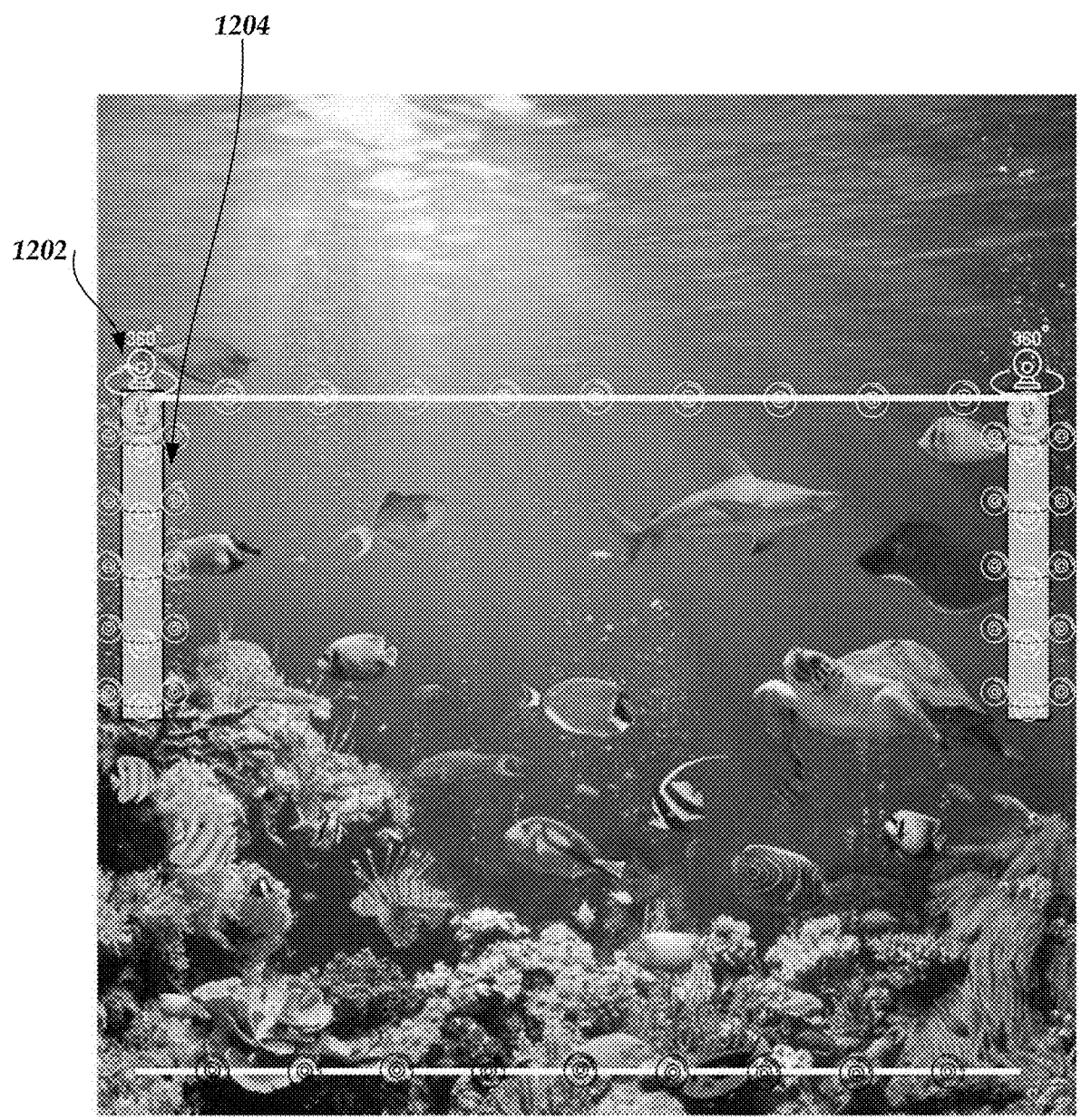

In some embodiments, a system of the present disclosure can be implemented in an underwater setting, as illustrated in FIG. 12. For example, a marine underwater space in which marine organisms are present can be fitted with the audiovisual camera system of the present disclosure. A series of cameras 1202 can be installed in the underwater space on one or more poles or other similar structures 1204. The cameras 1202 can be installed in such a way that the cameras 1202 can capture 360 degree images. The cameras 1202 can be positioned in different horizontal and/or vertical planes. A series of similar cameras, microphones, and/or other sensors can also be placed on the pole 1204 and/or on a string or wire that is supported by at least one pole 1204.

Figure 13:
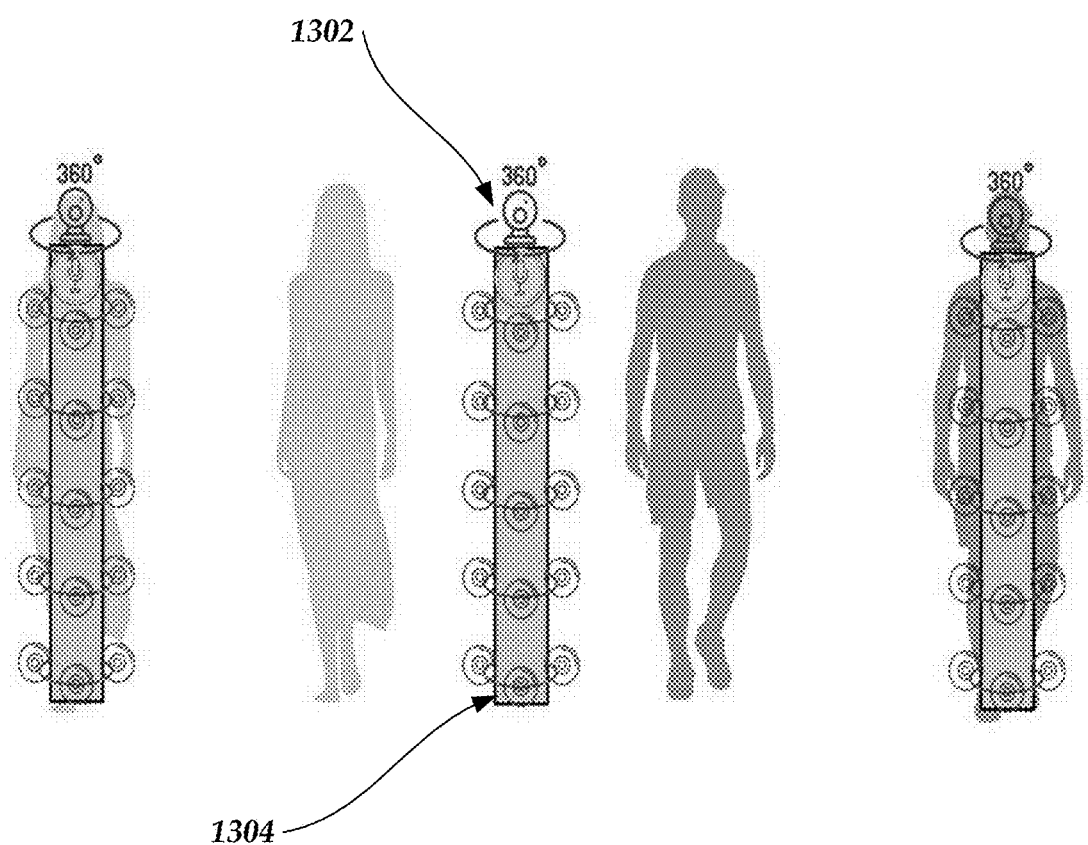

In some embodiments, the system of the present disclosure can comprise one or more poles 1304 with multiple embedded camera elements 1302, as depicted in FIG. 13. In some embodiments, a pole 1304 with a series of multiple 360 degree cameras placed at various angles and/or heights can enable the visualization of a real space at different angles and/or heights. A user viewing an image captured by a camera 1302 on the top of the pole 1304, or any of the cameras 1302 located around the pole 1304, may feel as if the user is standing right at the pole 1304.

As described herein, some embodiments of the present system may further correct for obstructions within a virtual representation of a scene. For example, one embodiment of the system herein may digitally remove people or other obstructions when presenting a scene to a user, thus "filling in" any identified gaps, obstructions, or otherwise occluding objects within a scene. Thus, in a system set up in a grocery store for example, the system may present empty aisles to a remote user, despite the fact that one or more people may be positioned within a space captured by an embodiment of the system herein. In some embodiments, obstructing objects may be identified by an embodiment of the object tracking system herein. wherein the object removal system is configured to remove one or more tracked objects from the scene. In some embodiments, an image processing system is configured to generate an object corrected output, where the object corrected output removes certain tracked objects from generated frames, and wherein the object corrected output is configured to resemble a scene wherein the object is absent, In some embodiments, the system may sample surrounding objects to fill in any identified obstructions. In some embodiments, the system may sample previously captured or archival frames in order to fill in any identified obstructions. In some embodiments, the system may be trained to fill in obstructions based on a training data set of representative frames. For example, when observing a grocery space using an embodiment of the system herein, an empty grocery aisle may be used either as a direct comparator, or trained with a machine learning model, such that the system may generate an appropriate viewpoint to remove particular objects, and present the viewpoints to a remote user.

Figure 18:
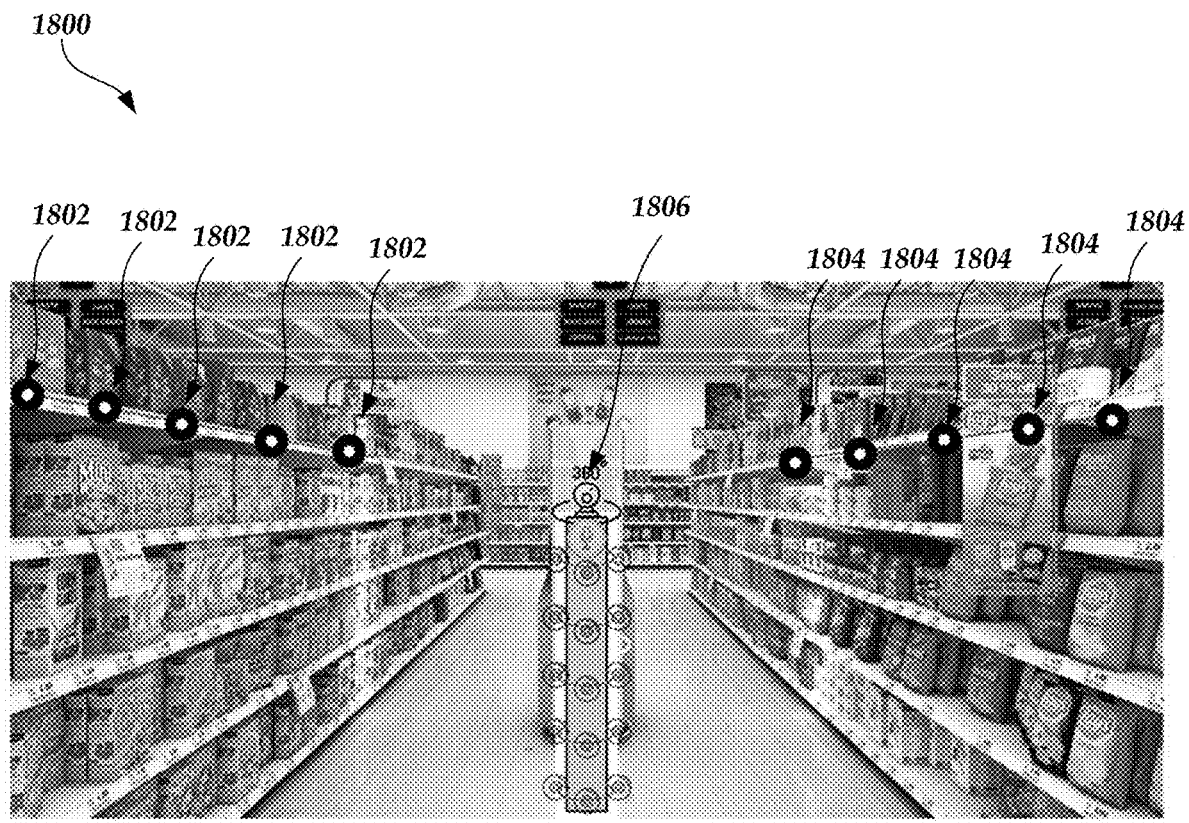
FIG. 18 depicts example illustrations of an embodiment of the system presented herein.

In some embodiments, the system of the present disclosure can be used to aid a user in shopping or selecting objects to purchase. In some embodiments, the system of the present disclosure can be implemented in a retail environment. In some embodiments, the system of the present disclosure can be implemented in a warehouse environment. As illustrated in FIG. 18, a retail environment can implement an embodiment of the system disclosed herein. In some embodiments, cameras 1802 can be arranged along an aisle on one side, and cameras 1804 can be arranged along the opposite side of the same aisle. In some embodiments, cameras 1806 may be placed substantially within the aisle. As described, cameras 1802 and 1804 may serve to approximate a viewpoint at the position of cameras 1806 using pixel-averaging as described with respect to FIGS. 16A-16F. Thus, the series of cameras 1802 and 1804 can generate a series of viewpoints at the midpoint, or any point in between cameras 1802 and 1804 to present to a user. In some embodiments, a user may, using an input device, a desire to see, view, or otherwise track an object within the boundaries of the system as described herein. For example, a user remotely viewing a grocery store, may ask to view a specific item or items, like laundry detergent, when they are currently viewing a scene in the cereal aisle. One or more cameras 1802 and/or 1804 may be labeled or otherwise associated with one or more items, such that the system may use the labeling or association to cause the user device 102 to display an image captured by a camera 1802 and/or 1804 associated with an item specified by the user. The system in response to the user's input, may then select a direction and predetermined speed of travel, and move the user's view through the system to navigate to their desired item, thereby traveling to the detergent aisle from the cereal aisle. Thus, an embodiment of the present system may be preprogrammed or trained to recognize specific objects, and then move users within the virtual space to a view the selected object. Some advantages of the present system allow for a user to assess stock values in real time, with the system configured to query a virtual inventory system to assess whether a desired good is available in storage or on the shelf, and to assess the relative quality of an object in real time. In some embodiments, the virtual inventory system is queried by the system when a user submits an input to view or move to an object. In some embodiments, the virtual inventory system is configured to communicate with the object tracking system to select suitable cameras to move a user through a space to arrive at the selected object. Moreover, objects that are recognized by the system described herein can visualize additional metadata, including estimated stock, nutrition information, price, discounts, and/or expiration dates, and present such information to the user when queried.

In some embodiments, the system of the present disclosure can comprise one or more mobile objects with multiple embedded camera elements. Mobile objects can include, cars, submarines, trains, buses, planes, drones, boats, people, animals, or any other non-sessile object. In some embodiments, the mobile objects may be equipped with GPS, and optionally, additional motion and position tracking equipment. In some embodiments, the camera series may be placed in various places within and external to a vehicle. Thus, a user may virtually tour and move within a vehicle, as well as observe the scene surrounding a traveling vehicle. In some embodiments, cameras comprising an embodiment of the system described herein may be affixed to mobile platforms like drones, which may move in response to an instruction from a user or an administrator of the drones such that users can view scenes from different defined spaces. For example, a space with multiple cameras may include any number of fixed, immobile cameras, and mobile camera platforms. Thus, drone-based cameras may be utilized to supplement or add additional views, or cameras from which a pixel-averaging system may be implemented according to embodiments described herein.

In some embodiments, a system of the present disclosure may be installed in a space dedicated for gaming. In some embodiments, a system of the present disclosure may be configured to display emoji characters in representations of the real space. In some embodiments, a system of the present disclosure may be configured to display video game or otherwise computer rendered images in place of, or augmenting certain objects within a scene. For example, a scene may be configured with cardboard representations and QR, or other proprietary codes, which instructs the system to insert a particular emoji, character, or computer-generated graphic. Such graphics may supplement, or supplant the tracked object, according to the pre-programmed functionality of the system. In some embodiments, the system may be further configured to provide haptic feedback. For example, a user wearing a vest with moveable haptic elements may perceive "pushes" or other physical forces, when interacting with select elements within a virtual space. As can be appreciated, the system described in the present disclosure may be implemented in a variety of settings, including amusement parks, amusement rides, walking, jogging, biking, or to tour hazardous or industrial locations.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
memory storing computer-executable instructions; and
a hardware processor in communication with the memory, wherein the computer-executable instructions, when executed by the hardware processor, cause the hardware processor to:
generate a virtual representation of a location, wherein the location comprises a plurality of image capture devices, wherein the plurality of image capture devices are each configured to record audiovisual content;
obtain data indicative of a point of view (POV), wherein the POV is selected via user input;
determine, based on the data indicative of the POV, a corresponding viewpoint in the virtual representation of the location; and
update the virtual representation of the location with an image captured by an image capture device in the plurality of image capture devices at a current time.

2. The system of claim 1, wherein the plurality of image capture devices comprises a microlens camera.

3. The system of claim 2, wherein the microlens camera comprises a plurality of lenses coupled together to form one of a sphere, a cylinder, a three dimensional ellipse, or a cone.

4. The system of claim 1, wherein the user input indicates a first direction at which to move within the virtual representation of the location, and wherein the image depicts a portion of the location in a direction of the first direction.

5. A system for capturing a scene, the system comprising:
a plurality of cameras, wherein each camera in the plurality of cameras is distributed throughout a location, wherein one or more subsets of cameras are located on a vector,
wherein each camera in the plurality of cameras is configured to capture an image at a predetermined frame per second value,
wherein the interval distance between adjacent cameras is determined by the speed of travel of the user and the effective frame rate of the system,
wherein the one or more subsets of the plurality of cameras is arranged in an array along a line; and
an image processing system comprising a hardware processor and in networked communication with the plurality of cameras, the image processing system configured with computer-executable instructions that, when executed by the hardware processor, cause the image processing system to integrate output from the plurality of cameras with a perspective view of a virtual representation of the location.

6. The system of claim 5, wherein each camera in the plurality of cameras is fixed in position,
wherein each camera is attached to a pole, a string, or a wall
wherein each camera in the plurality of cameras captures a fixed field of view.

7. The system of claim 5, wherein each camera in the plurality of cameras is immobile, wherein each camera is attached to a pole, a string, or a wall,
wherein the pole, the string, or the wall are immobile,
wherein each camera in the plurality of cameras captures a fixed field of view.

8. The system of claim 5, wherein each camera in the plurality of cameras is attached to one or more poles.

9. The system of claim 5, wherein the plurality of cameras is mounted on a string.

10. The system of claim 5, wherein each camera in the plurality of cameras is attached to one or more drones,
wherein the one or more drones are configured to fly in formation, wherein the one or more drones are equipped with GPS,
wherein the system is configured to maintain the relative position of the one or more drones,
wherein the one or more drones are configured to fly within a predefined space.

11. The system of claim 5, wherein the line wherein the one or more subsets of the plurality of cameras are located is a horizontal or vertical line.

12. The system of claim 5, wherein the system is configured for use within a retail environment,
wherein the retail environment is a grocery,
wherein the system is configured to store inventory status in an inventory system,
wherein the system is configured to allow a user to observe the retail environment.

13. The system of claim 12, wherein the system is configured to identify and track items on shelves of the retail environment.

14. The system of claim 13, further comprising an object tracking system, the object tracking system configured with computer-executable instructions that, when executed by the hardware processor, causes the object tracking system to select an object for tracking.

15. The system of claim 14, further comprising a natural language processing system, in networked communication with the object tracking system, the natural language processing system configured with computer-executable instructions that, when executed by the hardware processor, causes the object tracking system to select the object for tracking.

16. The system of claim 15, further comprising an object removal system, in networked communication with the object tracking system and the image processing system, the object removal system configured with computer-executable instructions that, when executed by the hardware processor, causes the object tracking system to select one or more objects for tracking and removal,
   wherein the object removal system is configured to remove one or more tracked objects from the scene.

17. The system of claim 5, wherein the system is configured for use within a warehouse environment
   wherein the system is configured to store inventory status in an inventory system,
   wherein the system is configured to allow a user to observe the warehouse environment.

18. The system of claim 5, wherein the system is configured for use on a vehicle.

19. The system of claim 5, wherein the system is configured for use on a bus, car, plane, train, or boat.

20. The system of claim 5, wherein the system is configured to display a user icon, wherein the user icon corresponds to the position of a user viewing the scene.

21. The system of claim 20, wherein the user icon further represents user input from the user viewing the scene, wherein the user input comprises speaking, gesture, body position, or effects selected from a user menu,
   wherein the image processing system is configured to generate an object corrected output,
   wherein the one or more tracked objects are selected from a list comprising: a person, shopping carts, vehicles, or cars.

* * * * *